US012019400B2

(12) United States Patent
Wolf et al.

(10) Patent No.: US 12,019,400 B2
(45) Date of Patent: Jun. 25, 2024

(54) EXTENDABLE CUFF FOR WATCH WINDERS

(71) Applicant: WOLF 1834, Inglewood, CA (US)

(72) Inventors: Simon P. Wolf, Los Angeles, CA (US); Fiona Howard, Los Angeles, CA (US)

(73) Assignee: WOLF 1834, Inglewood, CA (US)

( * ) Notice: Subject to any disclaimer, the term of this patent is extended or adjusted under 35 U.S.C. 154(b) by 792 days.

(21) Appl. No.: 17/087,570

(22) Filed: Nov. 2, 2020

(65) Prior Publication Data

US 2022/0137557 A1 May 5, 2022

(51) Int. Cl.
*G04B 3/00* (2006.01)

(52) U.S. Cl.
CPC .................................... *G04B 3/006* (2013.01)

(58) Field of Classification Search
CPC .......... G04B 3/006; G04D 1/06; G04D 7/009; G04D 7/006; G04C 13/105; G04C 9/08
See application file for complete search history.

(56) References Cited

U.S. PATENT DOCUMENTS

| | | | | |
|---|---|---|---|---|
| 6,910,802 B2 * | 6/2005 | Rustioni | G04D 7/009 | 81/7.5 |
| 7,575,367 B2 * | 8/2009 | Wolf, V | G04B 3/006 | 81/7.5 |

(Continued)

FOREIGN PATENT DOCUMENTS

| | | | |
|---|---|---|---|
| CN | 202929362 U | 5/2013 |
| CN | 207676128 U | 7/2018 |
| WO | 2014033292 A2 | 3/2014 |

OTHER PUBLICATIONS

Triple Tree, Watch Pillows for Watch Winder Please Select The Right Watch Pillows so to fit Your Watch Winder, Oct. 28, 2020, 8 pages, www.amazon.com.

(Continued)

*Primary Examiner* — Edwin A. Leon
(74) *Attorney, Agent, or Firm* — Fulwider Patton LLP

(57) ABSTRACT

A system for retaining a wrist watch in a watch winder having a hollow cylindrical turntable, includes a watch winder cuff defining a first circumferential profile, with two push tabs mounted on the cuff for inserting the cuff into the turntable and removing the cuff from the turntable, and one or more extension cuffs of differing length defining a second circumferential profile shaped to match the first circumferential profile, with a connector disposed thereon for engaging and joining the watch winder cuff and a selected extension cuff together. The connector may include a stub disposed on the extension cuff configured to fit snugly inside a depression on the watch winder cuff, or a hollow sleeve extending forwardly from the extension cuff and being configured to fit snugly over the watch winder cuff body to join the watch winder cuff and extension cuff together. The watch winder cuff preferably has an axial length of about one inch and the extension cuff, when joined to the watch winder cuff, preferably increases the axial length to about 2.25 inches to about 2.75 inches, depending on the size of the extension cuff. Both the watch winder cuff and the extension cuffs are made of compressible foam material such that the watch winder cuff and the extension cuffs are axially compressible under hand force.

25 Claims, 19 Drawing Sheets

(56) References Cited

U.S. PATENT DOCUMENTS

| | | | | |
|---|---|---|---|---|
| 11,144,013 | B2 * | 10/2021 | Buehler | G04D 7/009 |
| 11,669,050 | B2 * | 6/2023 | Favre | G04D 7/009 368/206 |
| 2005/0254352 | A1 * | 11/2005 | Wolf, V | G04D 7/009 368/206 |
| 2007/0223319 | A1 * | 9/2007 | Hill | G04D 7/009 368/206 |
| 2015/0117164 | A1 | 4/2015 | Ng | |

OTHER PUBLICATIONS

Jins&Vico Adjustable Watch Pillows for Automatic Watch Winders[2 Pack], Oct. 29, 2020, 6 pages, www.amazon.com.
[Newly Upgraded] Versa Automatic Single Watch Winder, Oct. 29, 2020, 3 pages, www.amazon.com.
Versa Solo Single Watch Winder, Oct. 29, 2020, 2 pages, www.versawatchwinders.com.
Versa Instruction Manual, 1 page, www.buywatchwinders.com.
Jqueen Watch Winder with Quiet Motors, Oct. 28, 2020, 12 pages, www.amazon.com.
Wolf Module 2.7 Standard Watch Cuff for Watch Winders Grey Gray, Oct. 29, 2020, 4 pages, www.ebay.com.
The Breitling Watch Blog, Oct. 29, 2020, 18 pages, blog.breitlingsource.com.
Search Report, dated Jan. 18, 2021, 1 page, from counterpart United Kingdom App. No. GB2018741.5.

* cited by examiner

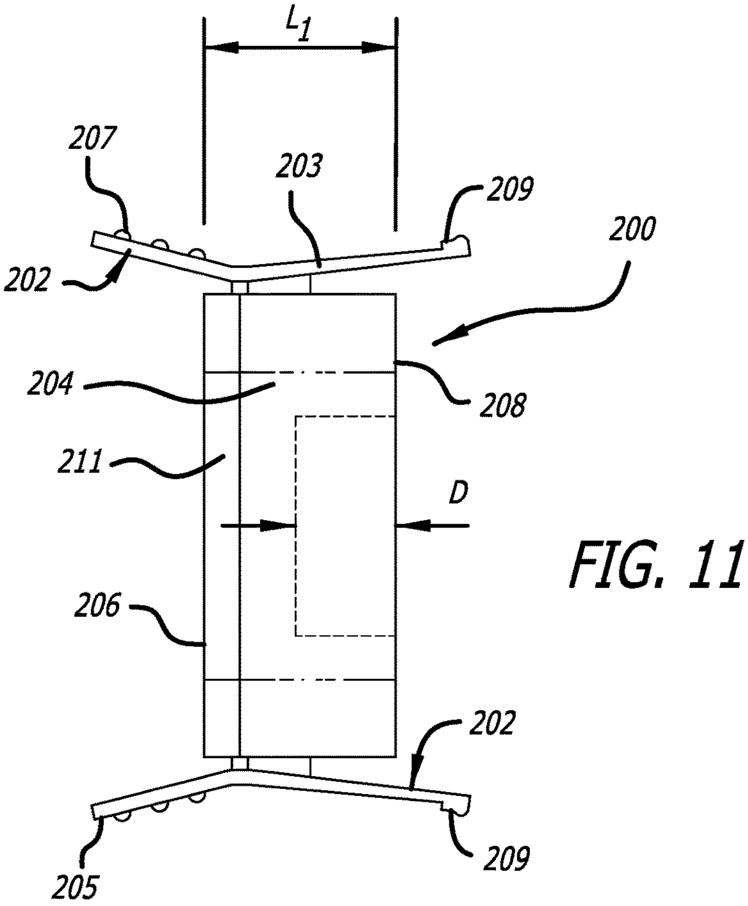
FIG. 11
FIG. 12
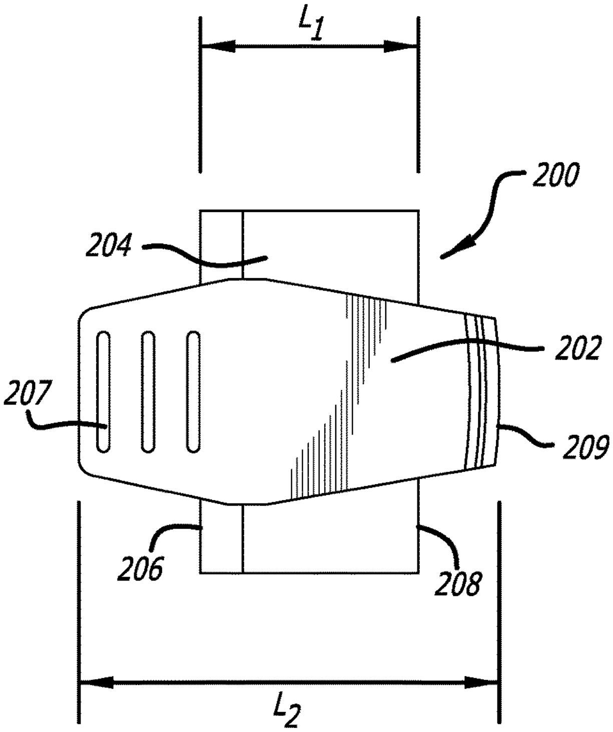

EXTENDABLE CUFF FOR WATCH WINDERS

BACKGROUND

This invention relates generally to automatic watch-winders, and more particularly has reference to an extendable watch winder cuff that can be adapted to accommodate a wide range of watch band, strap and bracelet sizes.

Self-winding watches have been available for many years. The winding mechanism of a self-winding watch typically comprises a rotary pendulum or rotor that is connected through a gear reduction system to a mainspring adapted to drive the escape mechanism of the watch. The pendulum pivots about a bearing and is generally capable of rotating a full 360 degrees. When the watch is worn, the random movements of the wearer cause the rotor to oscillate back and forth, or to spin completely about its axis, winding the mainspring. When completely wound, the mainspring will generally have sufficient energy to run the watch for up to about 12 to 48 hours, depending on the particular type of watch. Some watches can store enough energy to run eight days. In any event, the daily use of the watch will normally be sufficient to maintain continuous operation overnight, even if no winding takes place at night.

However, it is not uncommon for a person to own more than one watch, for use on different occasions such as sporting events, formal attire, or office attire, or as a personal statement, collectable or an investment. If one watch in a collection of watches is not worn for a few days, the energy in its mainspring may completely dissipate. Once the spring is unwound, a self-winding watch cannot, as can a manually wound watch, be fully rewound in a few seconds by the user. The task of maintaining multiple self-winding watches wound and operating is an inconvenience, and may also include resetting the time on the watch each time the spring runs down.

Thus, the owner of a self-winding watch or a collection of self-winding watches, may rely on a watch winder to keep the watches wound during periods of non-use. A watch winder is a powered device that eliminates the need for manual rewinding and resetting. Existing watch winders typically include a power driven spindle or turntable in the shape of a drum adapted to hold and rotate the watch about an axis coincident with its center. During rotation, the pendulum or rotor of the watch will hang downward under gravity, and the watch will rotate about the stationary rotor. In many watch winders, a removable cuff is provided. The watch is installed onto the cuff, so that the cuff and the watch may be inserted into a hollow cylindrical drum on the watch winder. The watch winder rotates the drum and the cuff and, thereby, rotates the watch with the effect of winding the watch spring mechanism. One of the applicant's own prior art watch winders is described in detail in U.S. Pat. No. 7,575,367, the entire disclosure of which is incorporated herein by reference.

Watch winders are frequently purchased without regard to the size (or length) of the band on the watch that must be wound. The band length is determined by the circumference of the wearer's wrist. Most women's watches have a band length of between 6.75 inches-7 inches, and most men's watches have a band length of between 7.5 inches-8.0 inches. The band can be a strap made of leather, nylon or non-metal material with a buckle-type closure, or a metal bracelet with a clasp or slide lock closure. So, for example, the cuff provided with a watch winder may be sized to hold a gentleman's watch having a long strap or bracelet. And yet, it may turn out that the person who eventually gets to use the watch winder is a woman with a very small wrist, and the length of the strap or bracelet on her watch is too small to fit on the cuff. A similar problem might arise where a person purchases a winder with the intention of using it for winding both a man's watch and a women's watch, such as for example where a husband and wife both use the same winder.

There exists, therefore, a need in the art for an improved watch winder cuff that can be used for a group of watches having substantially different band lengths.

The present invention addresses those and other needs.

SUMMARY OF THE INVENTION

Briefly, and in general terms, the present invention relates to a new type of system for retaining a watch inside a watch winder, the system embodying a watch winder cuff defining a first circumferential profile, the cuff having a first axially forward portion and a first axially rearward portion, and further including two push tabs mounted on the cuff and extending forwardly of the first axially forward portion, and an extension cuff defining a second circumferential profile shaped to match the first circumferential profile, the extension cuff further defining a second axially forward portion and a second axially rearward portion, the second axially forward portion having a connector disposed thereon for engaging the first axially rearward portion when the first axially rearward portion is positioned in close proximity to the second axially forward portion to join the watch winder cuff and extension cuff together.

In one embodiment, the connector is a stub configured to fit snugly inside a depression or opening on a rearward surface of the watch winder cuff. The depression may include a divider wall dividing the depression into two equal halves, and the stub may be cleaved into two equal halves by a slit to snugly receive the divider wall when the stub is inserted into the depression.

In an alternative embodiment, the connector is a hollow sleeve or collar extending forwardly of the extension cuff and being configured to fit snugly over the watch winder cuff body. The sleeve may be provided with two slits, each slit extending axially rearward from a forward perimeter of the sleeve for receiving flanges that mount the push tabs on the cuff.

Preferably, the watch winder cuff has an axial length of about 1.0 inches, and the extension cuff, when joined with the watch winder cuff, increases the axial length to about 2.25 inches or 2.75 inches, depending on the size of the extension cuff. The watch winder cuff, when not joined together with the extension cuff, preferably has an axially oriented perimeter of about 5.75-6.25 inches, and the watch winder cuff and extension cuff, when joined together, preferably has an axially oriented perimeter of about 8.75 inches to about 9.75 inches, depending on the size of the extension cuff.

The watch winder cuff and the extension cuff are preferably made of compressible foam material such that the watch winder cuff and the extension cuff are axially compressible under hand force.

The system may further include a second extension cuff defining a third circumferential profile shaped to match the first circumferential profile, the second extension having a third axially forward portion and a third axially rearward portion, the third axially forward portion having a connector disposed thereon for engaging the first rearward portion when the first rearward portion is positioned in close proximity to the third forward portion to join the watch winder cuff and second extension cuff together, the extension cuff and the second extension cuff having different axial lengths, so that the extension cuff and the second extension cuff can be interchangeably, individually and selectively connected to the watch winder cuff to vary the size of watch band that may be accommodated.

The present invention also relates to a new method for mounting wrist watches with different size watch bands on a cuff for insertion into a hollow turntable of a watch winder, the method includes providing a watch winder cuff for receiving a wrist watch, the cuff having an axially oriented perimeter of a first size, and having two push tabs mounted thereon extending in a forwardly direction, mounting a first wrist watch around the cuff's axially oriented perimeter, the first wrist watch having a watch band adjustable to fit snugly around the axially oriented perimeter of the watch winder cuff, installing the cuff with the first wrist watch in the hollow turntable, rotating the hollow turntable, stopping rotation of the hollow turntable, and removing the cuff from the hollow turntable, removing the first wrist watch from the cuff, connecting an extension cuff onto a rearward end of the watch winder cuff such that the watch winder cuff and extension cuff in combination have an axially oriented perimeter of a second size being larger than the first size, mounting a second wrist watch around the watch winder cuff and extension cuff's combined axially oriented perimeter, the second wrist watch having a watch band adjustable to fit snugly around the combined axially oriented perimeter of the watch winder cuff and extension cuff, installing the watch winder cuff and extension cuff along with the second wrist watch in the hollow turntable, and rotating the hollow turntable.

The method further includes removing the watch winder cuff and extension cuff along with second wrist watch from the hollow turntable, removing the second wrist watch from the watch winder cuff and extension cuff, removing the extension cuff from the watch winder cuff, connecting a second extension cuff onto a rearward end of the watch winder cuff such that the watch winder cuff and second extension cuff in combination have an axially oriented perimeter of a third size being different from the second size, mounting a third wrist watch around the watch winder cuff and second extension cuff's combined axially oriented perimeter, the third wrist watch having a watch band adjustable to fit snugly around the combined axially oriented perimeter of the watch winder cuff and second extension cuff, installing the watch winder cuff and second extension cuff along with the third wrist watch in the hollow turntable, and rotating the hollow turntable.

Other objects, features and advantages of the invention will be apparent when the disclosure is considered in conjunction with the drawings set forth herein, which should be construed in an illustrative and not limiting sense.

BRIEF DESCRIPTION OF THE DRAWINGS

FIG. 11 is a side elevational view of an alternative cuff having features of the present invention.

FIG. 12 is an another side elevational view of the cuff of FIG. 11, rotated ninety degrees.

DETAILED DESCRIPTION OF EXEMPLARY EMBODIMENTS

With reference to the drawings, which are provided for purposes of exemplary illustration, a new and improved watch winder cuff system embodying the principles and concepts of the present invention and generally depicted in FIGS. 11-32 will be described.

Figure 1A:
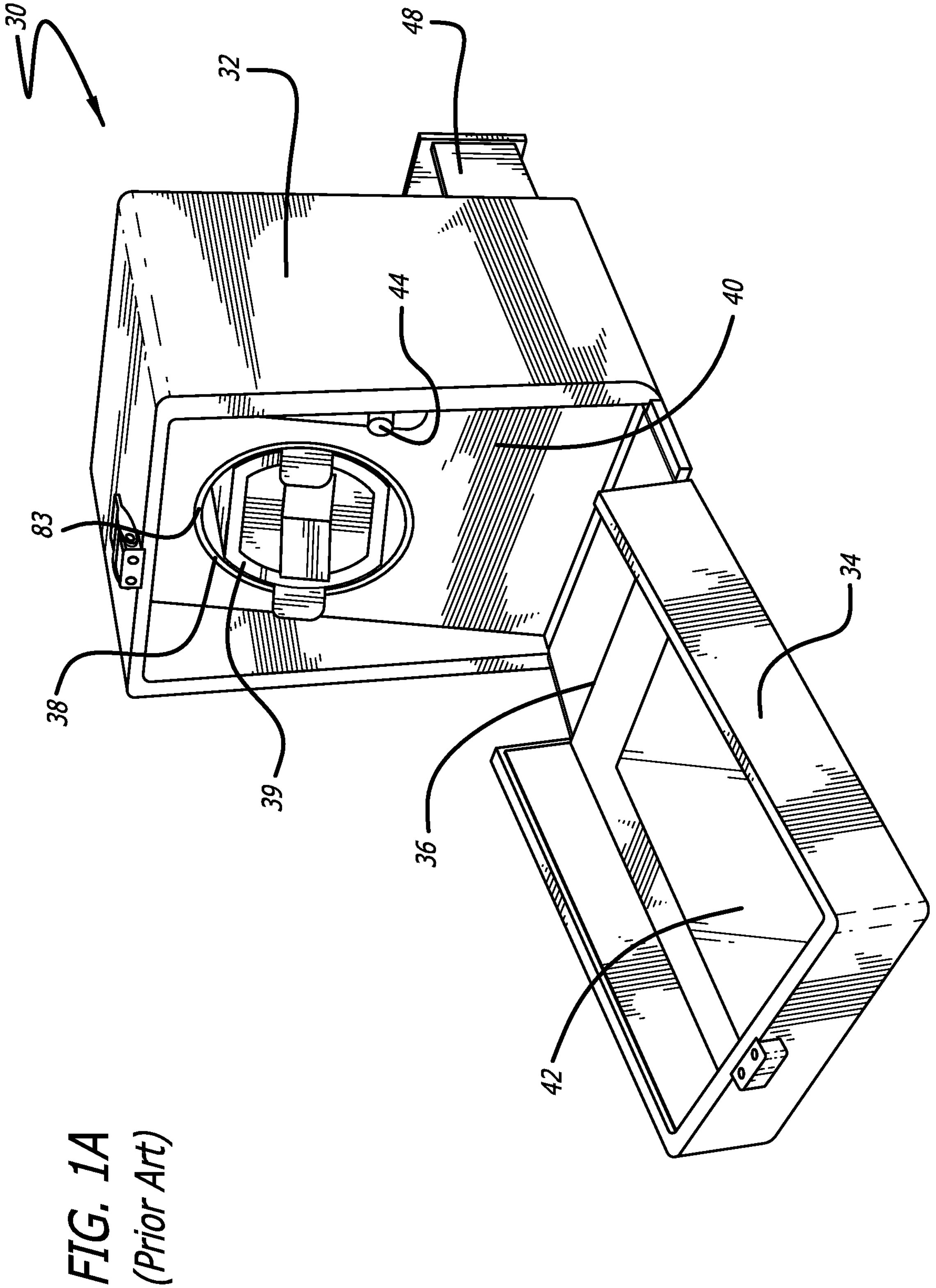
FIG. 1A (Prior Art)
FIG. 1A is a perspective view of a watch winding apparatus, known in the art, showing specifically the outer housing and features thereof.
Figure 1B:
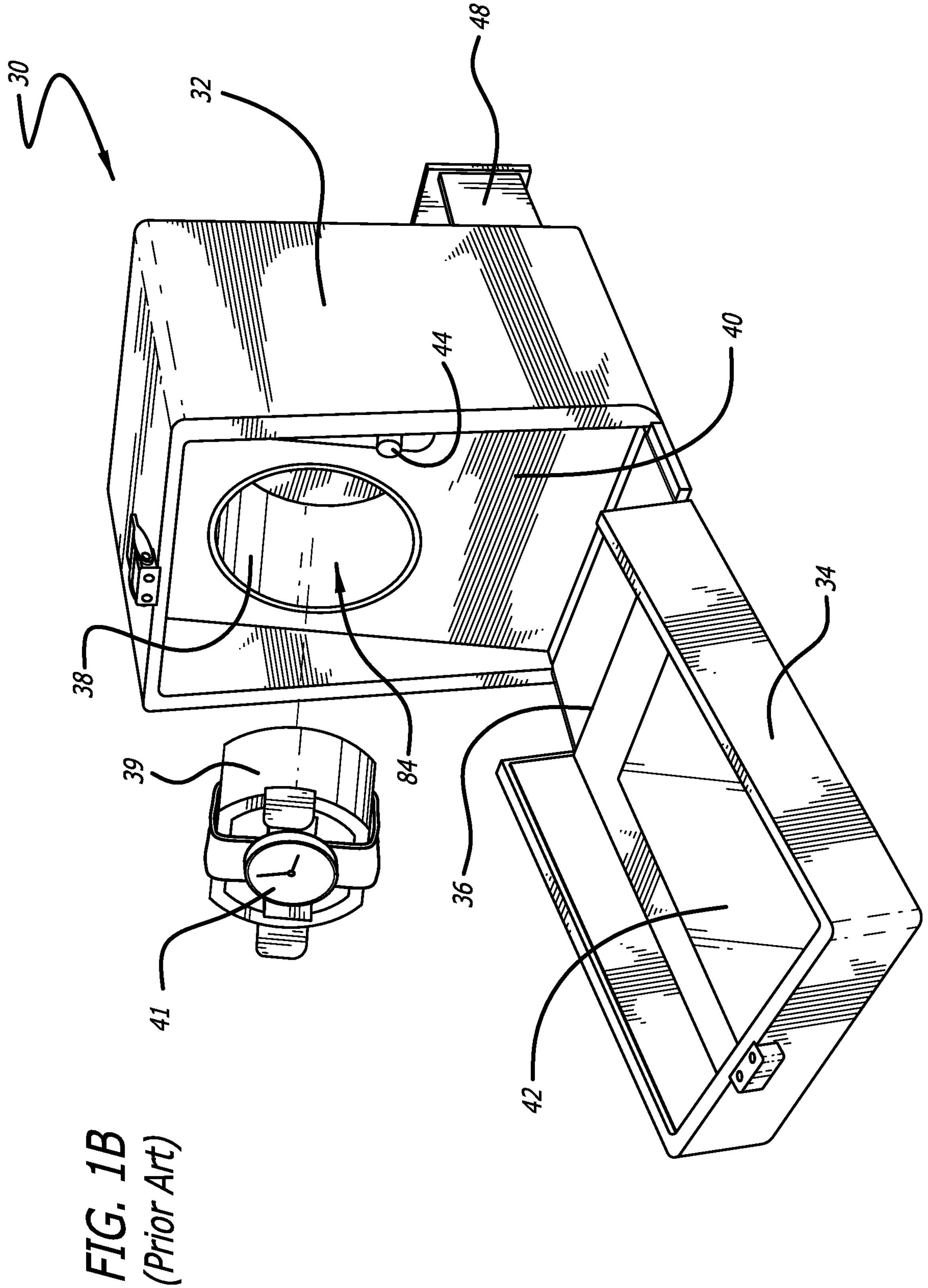
FIG. 1B (Prior Art)
FIG. 1B is a perspective view of the watch winding apparatus shown in FIG. 1A, showing a removable cuff with a watch mounted thereon, separated from the rest of the apparatus.
Figure 3:
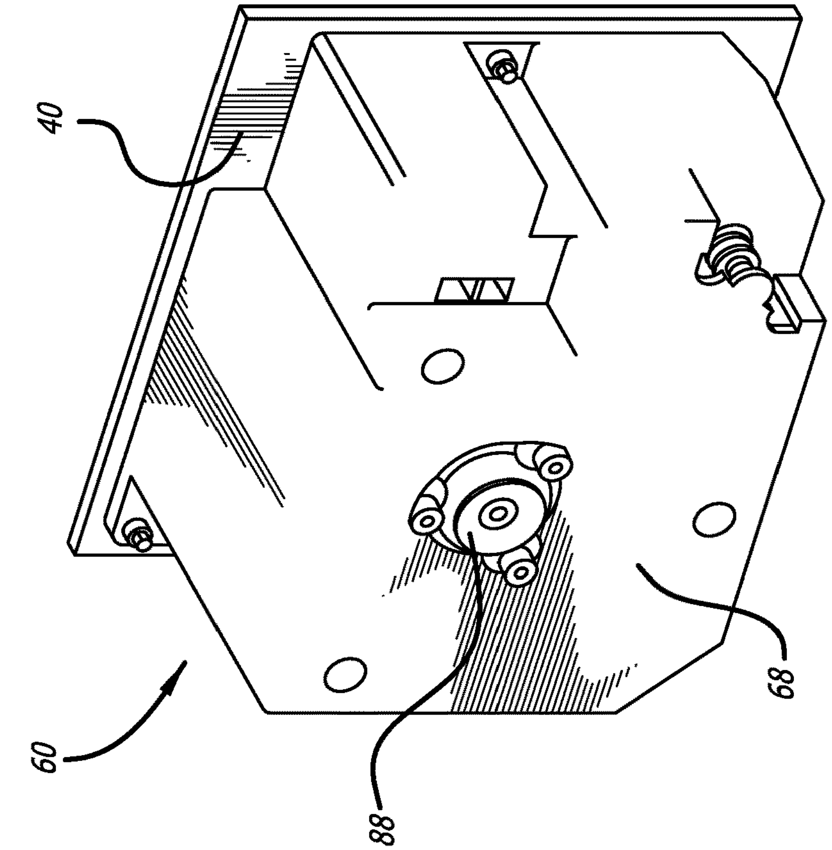
FIG. 3 (Prior Art)
FIG. 3 is a rear perspective view of the watch winding mechanism shown in FIG. 2.

The cuff system of the present invention is suitable for use with a watch winder 30 of the type shown in FIGS. 1A and 1B. Such a watch winder 30 can be constructed in various ways, and while one particular configuration will be described herein, other variations and modifications especially in terms of the internal workings are possible, and will be apparent to those in the art.

Figure 2:
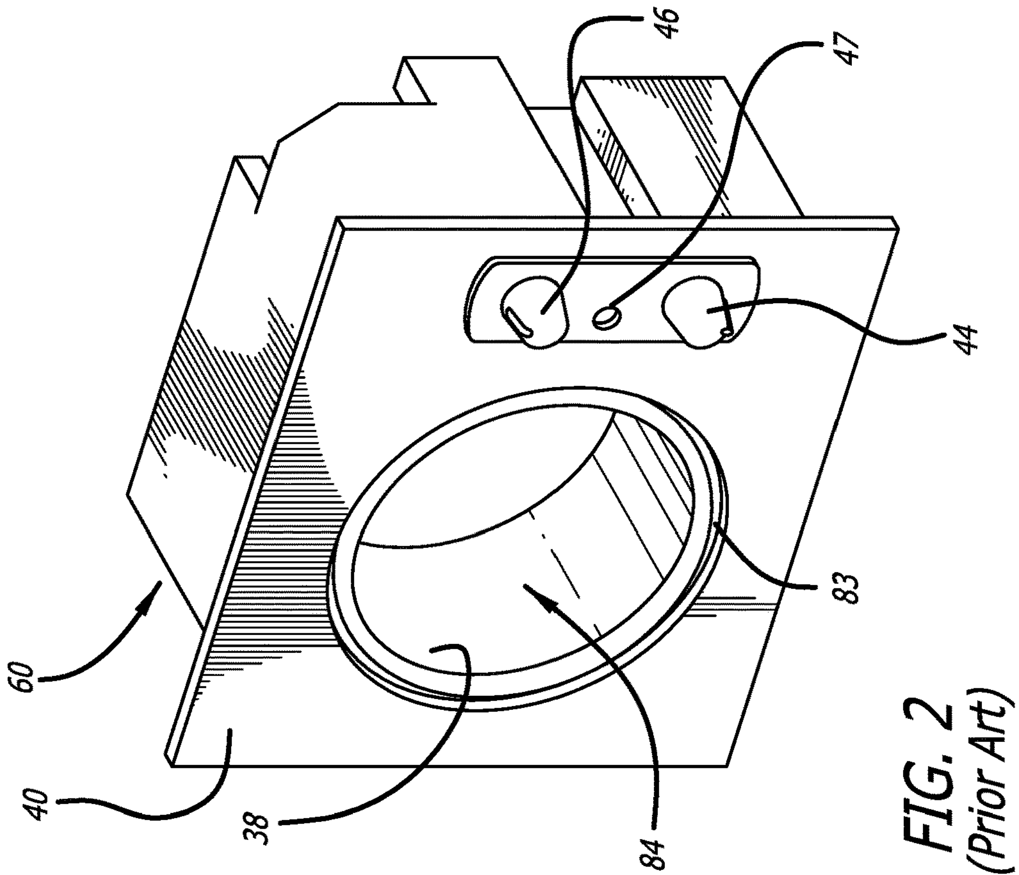
FIG. 2 (Prior Art)
FIG. 2 is a front perspective view of the watch winding mechanism that is enclosed within the housing shown in FIGS. 1A and 1B, separated from the rest of the housing.

The watch winder 30 typically has a rectangular sided exterior housing 32 including an exterior front cover 34 that opens downwardly about a bottom hinge 36 to expose a turntable drum 38 mounted centrally on an interior front wall 40. A watch winder cuff 39 (such as is known in the art) is configured to be removable from the turntable to permit a watch 41 to be mounted on the cuff, so that the cuff and watch combination may be installed on the turntable 38. The front cover 34 may include a glass or plastic transparent window 42 for viewing the contents of the housing 32. Also mounted on the interior front wall 40 are control switches 44, 46 (46 not visible in FIGS. 1A and 1B) for controlling the operation of the turntable 38. An LED, or light emitting diode 47 (FIG. 2) may also be installed on the control panel to indicate the status of the winder. For example, a green light may indicate that the winder is activated, and a red light may indicate a low battery condition. A lockable drawer 48, adapted to hold DC batteries, slides out of the rear wall of the exterior housing 32. Alternatively, the batteries can be held in a battery compartment with a closeable lid (not shown) built into the rear wall of the housing 32. A DC jack (not shown) is also mounted on the rear wall of the exterior housing 32 to receive an input plug from an optional AC/DC converter, connected to a 110 or 220 volt AC source (not shown).

The watch winding apparatus 30 as described may include, within the exterior housing 32, an interior housing 60, as exemplified in FIGS. 2-6. The interior housing 60 is configured to contain the rotatable turntable 38, a drive assembly 64 (FIG. 4) for rotating the turntable, an electronic circuit 66 (FIG. 4) for controlling the drive assembly, and the control switches 44, 46 for controlling the turntable via the circuit 66.

The interior housing 60 may be formed of molded plastic and comprise a back wall 68 to which there are attached two vertical side walls 70, 72, a top wall 74, and a bottom wall 76, defining an interior space 78. When the interior housing 60 is positioned within the exterior housing 32, the interior space 78 is closed by the front wall 40 of the external housing 32.

Figure 5:
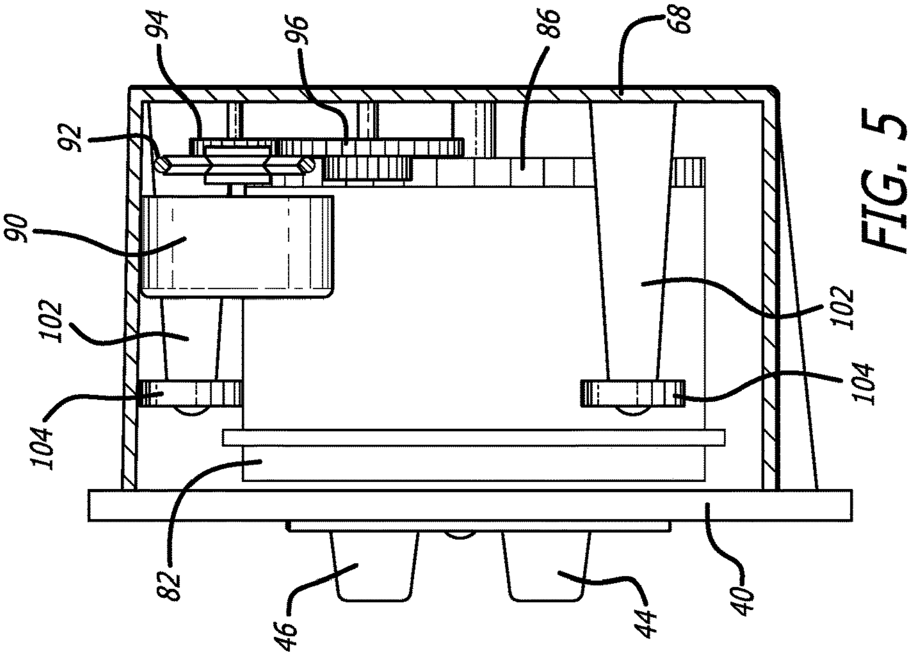
FIG. 5 (Prior Art)
FIG. 5 is a sectional side view of the watch winding mechanism shown in FIG. 4, taken substantially along the line 5-5 in FIG. 4.
Figure 4:
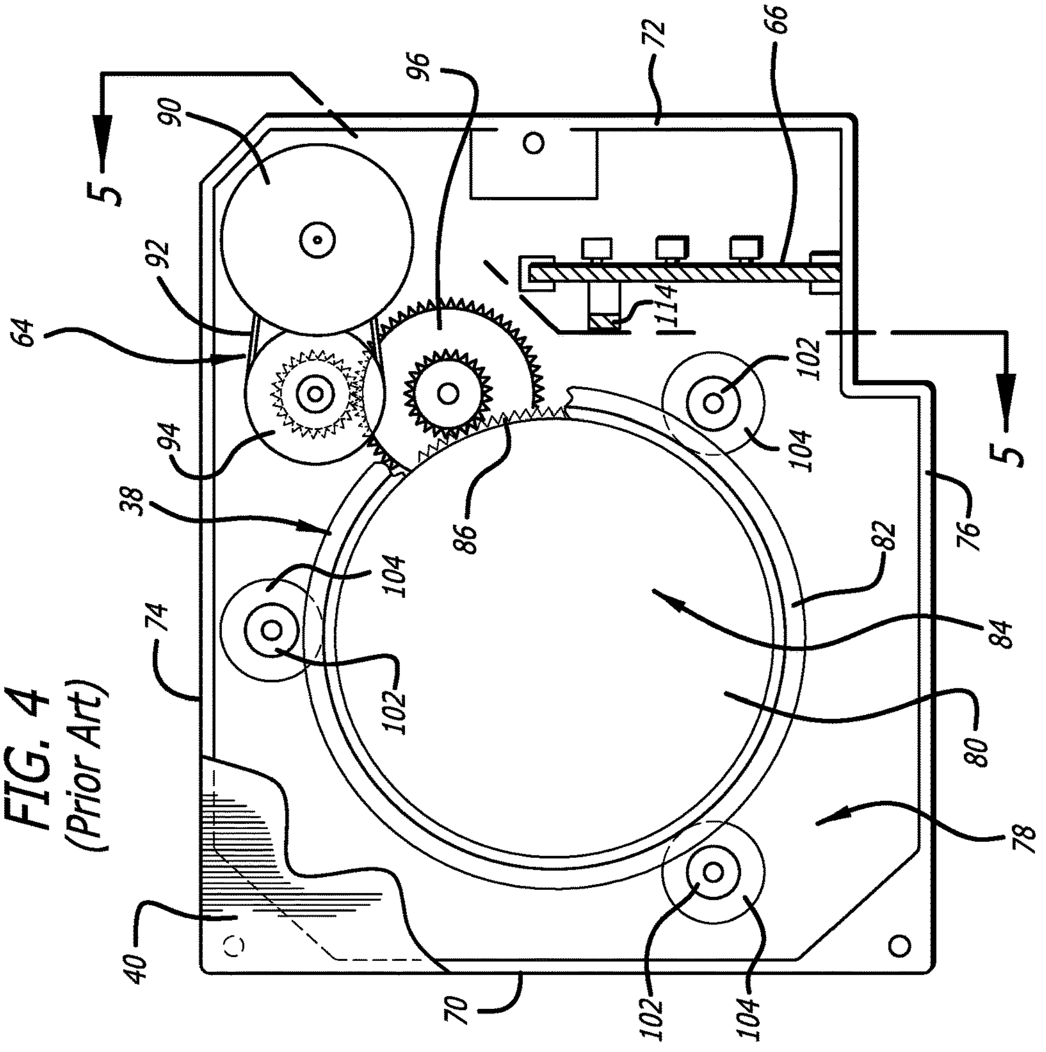
FIG. 4 (Prior Art)
FIG. 4 is a fragmentary front view of the watch winding mechanism of FIG. 2, with the front cover removed.
Figure 6:
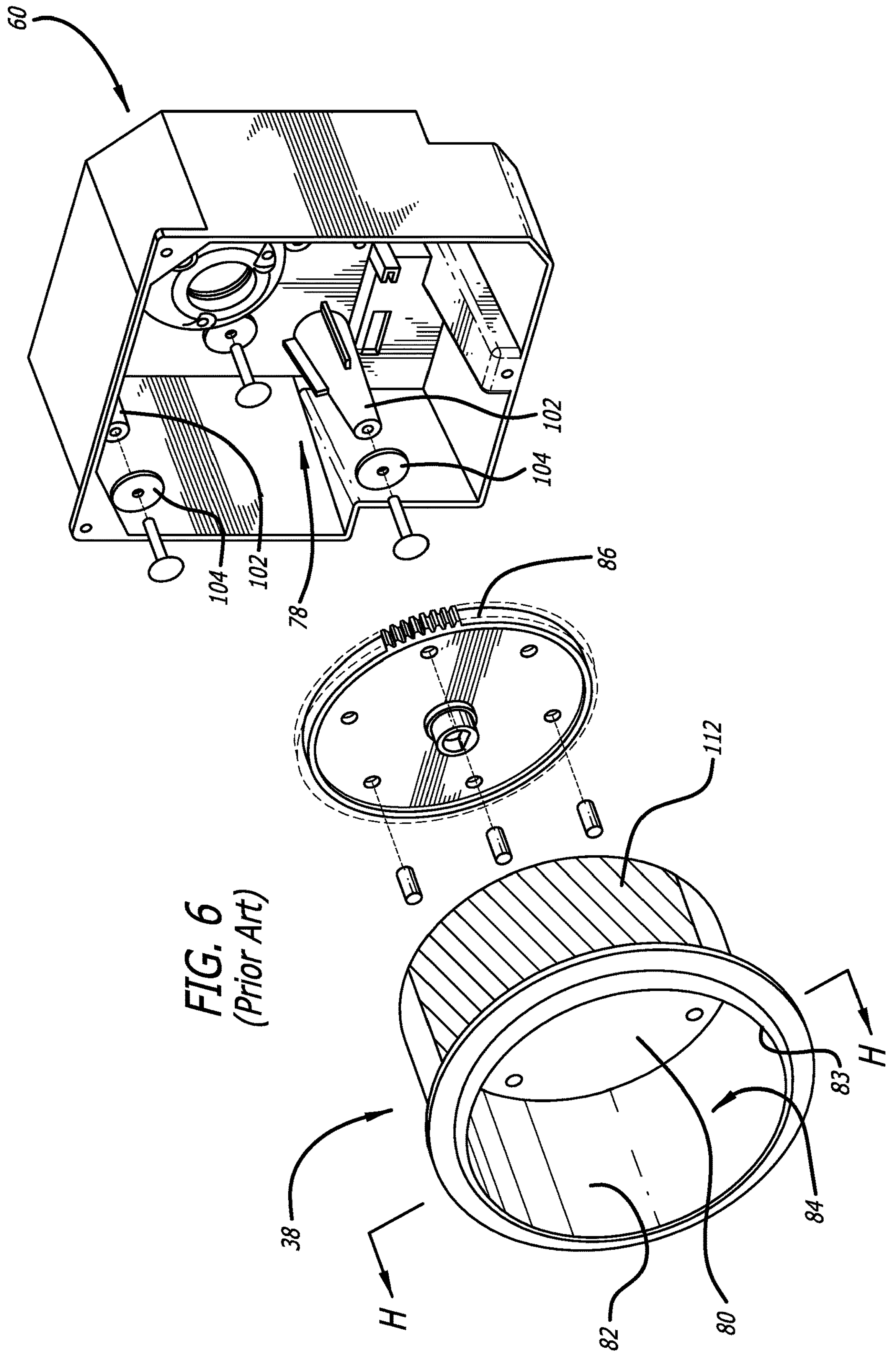
FIG. 6 (Prior Art)
FIG. 6 is a partially exploded view of certain aspects of the watch winding mechanism shown in FIGS. 2-5.

Referring to FIGS. 4-6, the turntable 38 generally includes a circular base 80 and a cylindrical sidewall 82, giving it a drum-like shape with an interior bore 84 open at one end. A toothed large gear wheel 86 having a diameter approximately the same as the base 80 of the turntable 38 is attached directly to the base. The turntable 38 is rotatably attached to the interior housing 60 through the large gear wheel 86 which is connected to a bearing 88 (FIG. 3) mounted on the back wall 68 of the interior housing.

The drive assembly 64 comprises a small electric motor 90 which transmits rotational movement to the turntable 38 via a pulley 92 and intermediate gears 94, 96 configured to mesh with the large gear 86 on the turntable. Power for the motor is supplied either by closed cell batteries, or by a power cord. Where a power cord is used, with an AC/DC adapter, it plugs into a conventional 110 volt or 220 volt AC outlet. A direct drive mechanism (not shown) where the gear box attaches directly to the drum without any drive belt can be used, if desired.

The interior housing 60 includes a plurality of cantilever supports 102 extending from the back wall 68 into the interior space 78, arranged in a generally triangular pattern. Each support 102 may include a rotatable annular bearing 104 at a terminal end portion of the support, preferably made of rubber or a similar resilient compound. Each support 102 is positioned to permit its respective bearing 104 to abut the outer surface of the cylindrical wall 82 on the turntable 38 and provide a force to stabilize the turntable against lateral movement, particularly when the turntable is being powered by the motor. This particular configuration of cantilever supports with resilient bearings provides for smooth, quiet rotation of the turntable 38. The number of supports 102 and bearings 104 can be increased, if desired, to provide additional stability and support.

When the watch winder 30 is in use, a self-winding watch 41 is mounted on the cuff 39 (FIG. 1B) which is then inserted into the bore 84 of the turntable 38 so as to allow the face of the watch to protrude on the outside of the front wall 40 of the housing 32, and to allow the watch to be rotated by the turntable in the plane of the hands of the watch. Control of the turntable's rotation is achieved by the electronic circuit 66 (FIG. 4), which may include a conventional programmable microprocessor capable of receiving input signals, and of generating output signals to achieve control of the turntable 38. The microprocessor may be configured to activate the motor 90, to determine in which direction the motor will rotate, to count and to limit the number of rotations executed by the turntable 38, to interrupt rotation of the turntable for interspersed periods of time, and/or to terminate rotation of the turntable entirely after a number of rotations. Operation of the control circuit 66 through the microprocessor is achieved using, for example, switches 44, 46 located on the front wall 40 of the housing 32.

A particularly advantageous feature of the watch winder 30, is that the control circuit 66 is configured to count the number of revolutions turned by the turntable 38. In the disclosed embodiment, a light-reflective film 112, formed, for example, as a silver or copper coated plastic film, is fixed to the outer surface of the turntable's cylindrical wall 82 such that less than 360 degrees, preferably 180 degrees, of the wall circumference is covered by the film 112 (FIG. 6). Included in the circuit 66, an infrared reflective sensor 114 is positioned proximate the cylindrical wall 82 such that, when the turntable rotates through 360 degrees, light emitted from the infrared sensor is reflected from the film 112 only throughout the rotational angle wherein the film is present on the outer wall 82, but not where the film is absent. The resulting break in reflected light each revolution is detected by the infrared sensor and is interpreted by the circuit 66 as marking the passage of a single revolution. Additionally, the circuit 66 is configured to have a memory which maintains a cumulative count of the number of rotations executed by the turntable. Counting rotations is advantageous because setting the motor to run for a set period of time may not be sufficient to fully wind a watch, especially where the watch is a large or heavy watch that may cause the speed of rotation to be slowed or where there is a fluctuation in the power supply. Rather, setting the circuit 66 to allow rotation of the turntable 38 for a set number of rotations before stopping, will tend to overcome this problem and have the advantage of terminating the rotations when the watch is likely to be fully wound, thereby avoiding over-winding or under-winding and an unnecessary waste of battery energy. The plastic film and infrared sensor can be replaced by a suitable photoelectric sensor or alternative detecting arrangement, if desired, to count the number of rotations.

If desired, the circuit 66 also may be configured to automatically delay the start of the turntable's rotation, so that, when the circuit is initially activated through the switches 44, 46 rotation of the turntable 38 commences only after a period of time. In one embodiment, the delay is a long delay of between 8 and 16 hours, preferably about 12 hours. This delay allows the watch to run down to some extent before the winding commences. In another embodiment, the circuit 66 may be configured to provide a short delay in starting rotation, of as little as ten seconds, preferably between 5 and 15 seconds. This has the advantage of allowing the user to activate the circuit through the switches 44, 46 before he places his watch 41 on the turntable 38, and gives him sufficient time to install the watch on the turntable after he has switched on the circuit. Both modes of start-delay operation (i.e., long delay and short delay) can be provided in a single watch winder, with the user having the ability to choose between the two modes by selecting the corresponding position on a three position (off—mode 1—mode 2) switch 44. The circuit 66 also may be configured to allow the user to manually alter the delay time available for each of the two start delay modes of operation.

Based on the capability of the circuit to count the number of rotations executed by the turntable 38, the circuit 66 may be further configured to pause the motor once a pre-programmed number of rotations has been achieved, and to resume rotation after the pause, continuing with this pattern of rotation and pause until the winder is manually turned off. Alternatively, the circuit 66 may be configured to automatically terminate the cycles of rotation and pause for a period of time after a predetermined total number of rotations has been executed. The number of rotations will be set to correspond to the average number needed to fully wind most self-winding watches.

The circuit 66 may be configured to allow the user to manually adjust the circuit, prior to use of the winder, to variably alter and predetermine the number of rotations in each set of rotations and the length of the pause period between sets of rotations. The circuit 66 also may be configured to allow the user, prior to use, to cause the direction of each succeeding set of rotations to automatically either reverse direction, or to be all clockwise, or to be all counter-clockwise, to suit the needs of the particular watch, controlled by switch 46 which may have a three position setting—clockwise, alternating directions, anti-clockwise.

Figure 7:
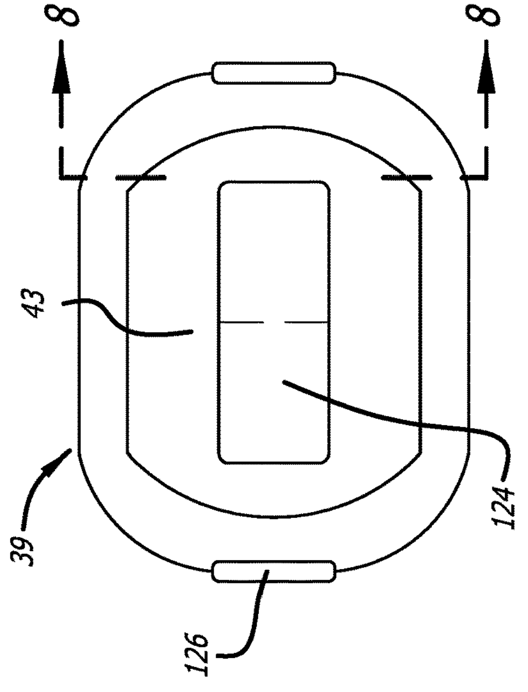
FIG. 7 (Prior Art)
FIG. 7 is an enlarged front plan view of a removable cuff suitable for holding a watch and for insertion into the watch winding apparatus of FIGS. 1A and 1B.

With reference to FIGS. 7-10, the prior art cuff 39 is shown and described in further detail. The cuff 39 has a generally cylindrical form (when viewed in elevation) which is sized and shaped to be slidably inserted into the bore 84 of the turntable 38, as shown in FIGS. 1A and 1B. When the cuff 39 is in place, the front face 43 of the cuff is generally flush with, or extends slightly beyond, the front edge 83 of the turntable drum 38. The sidewall 47 of the cuff 39 has a flattened oval shape (when the cuff 39 is viewed in plan), as best shown in FIG. 7. The flattened surfaces on opposite side of the cuff 39 provide a gap or clearance between the cuff 39 and the wall 82 of the turntable drum 38 as shown in FIG. 1A, to allow the strap or bracelet of a watch 41 to pass between the cuff and the turntable wall when the watch 41 is mounted on the cuff with the strap or bracelet extending around the cuff from front to back and passing over the flattened portions of the cuff, as shown in FIG. 1B.

A typical standard-size cuff 39 has a diameter of about 2.5 inches along the major axis and a diameter of about 2.125 inches along the minor axis, with an axial length of about 2.75 inches, to accommodate watches for a wrist size of about 8 inches to 10 inches. A typical smaller size cuff 39 has the same diameters, but a slightly shorter axial length of about 2.25 inches, to accommodate watches for a wrist size of about 7 inches to 9 inches. Some manufacturers provide a choice of cuffs 39 of different size as optional aftermarket accessories, but this solution is inadequate because the standard cuff sizes typically provided are not designed to accommodate watch bands of very small size. Moreover, this approach adds extra cost because the customer needs to purchase multiple cuffs to accommodate watches of different wrist sizes.

Figure 10:
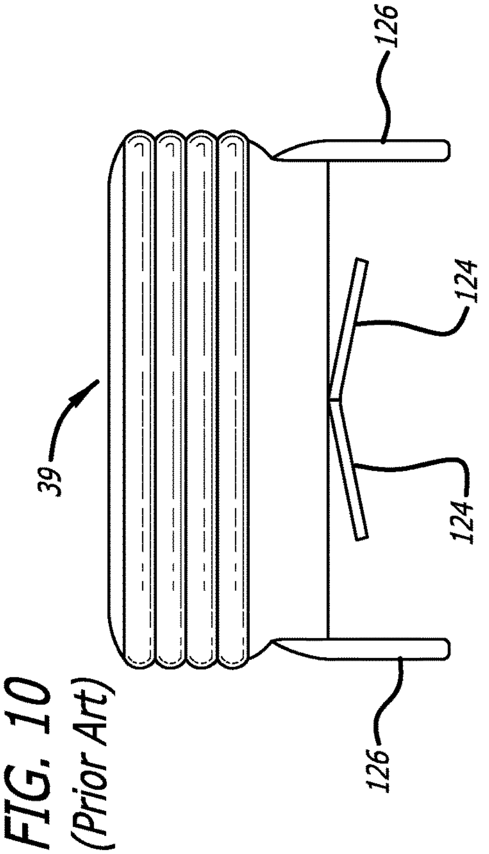
FIG. 10 (Prior Art)
FIG. 10 is a side elevational view of the cuff of FIG. 7, showing the cuff compressed from front to back, along its axis, to facilitate mounting a wrist watch thereon.
Figure 9:
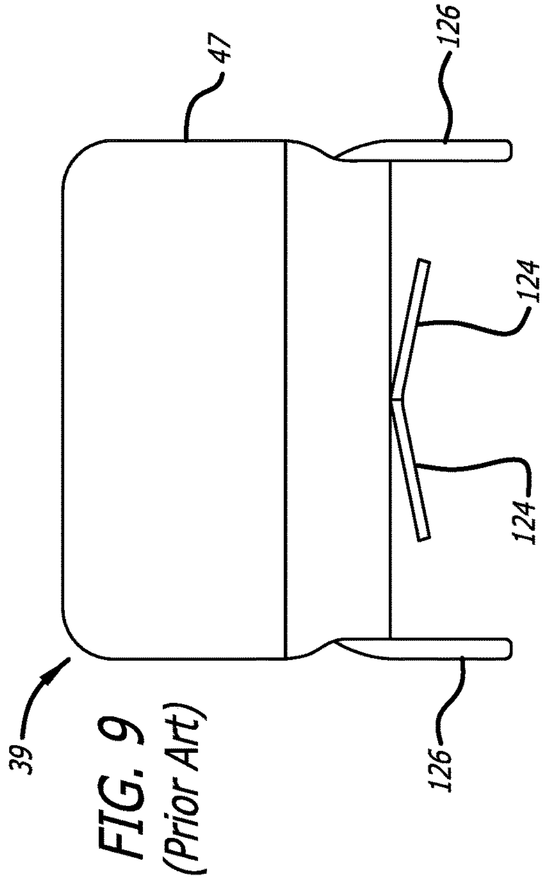
FIG. 9 (Prior Art)
FIG. 9 is a side elevational view of the cuff of FIG. 7.

The cuff 39 is typically configured to be compressible using hand force in an axial direction, as shown in FIG. 10. This feature allows the watch to be mounted on the cuff and secured thereto. To begin the process, the cuff 39 is first removed from the watch winder drum 38 by pulling on a pair of flexible tabs 124, made of leather or similar material, set in the center of the front face of the cuff. The watch band is then closed or buckled. The cuff 39 is compressed axially (as shown in FIG. 10) and the watch 41 (with the closed band) is slid over the compressed cuff 39, with the watch dial facing outwardly as shown in FIG. 1B. Once the watch 41 is in place with the watch case positioned over the leather tabs 124, the axial force is removed and the cuff 39 is allowed to decompress and re-expand to securely hold the watch on the cuff ready for insertion into the watch winder drum 38. Alternatively, the watch 41 can be placed onto an uncompressed cuff 39 (as shown in FIG. 9), with the watch band open, then the band closed tightly around the cuff 39 so that the watch 41 is held in place. Once the watch 41 is secured to the cuff 39 using either method described, the cuff is inserted back into the drum 38 by grasping the two rigid longitudinal tabs, or wings, 126 connected to the sidewall 47 and extending forwardly of the front face of the cuff. The cuff 39 may be held in place in the drum 38 by a friction fit between the sidewall 47 of the cuff and the sidewall 82 of the drum, in cases where the cuff is comparable in size to the diameter and axial length of the drum to provide a stable friction fit. Alternatively, the tabs 126 may be replaced with locking tabs of the type shown in FIG. 35 (to be further described later). Those locking tabs are provided with a radially outward protrusion or rib (not shown) on the outer surface of the tab which engages an annular groove on the interior surface of the turntable drum 38 to provide a snap fit between the cuff assembly and turntable to lock the cuff assembly into place when the cuff 39 is properly positioned in the turntable drum. With the use of these locking tabs, a friction fit between the drum 38 and the sidewall 47 of the cuff 39 is not necessary to hold the cuff in the drum.

Figure 8:
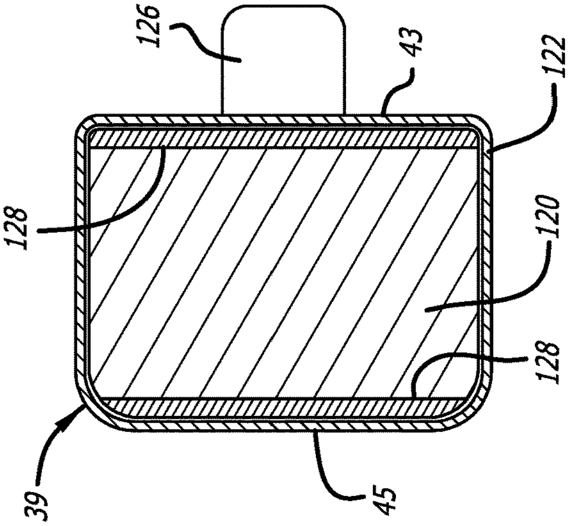
FIG. 8 (Prior Art)
FIG. 8 is a sectional view, taken substantially through the line 8-8 of FIG. 7.

In order to achieve the desired compressibility, the cuff 39 is typically formed with an internal block of open cell foam 120 having the overall desired shape of the cuff, as best shown in FIG. 8. The foam block 120 may be sandwiched between two rigid plates 128, preferably made from rigid hardboard, the resulting combination being enclosed in a porous material cover 122 which may be stitched or glued closed at the seams. The combination of open cell foam and porous material gives the cuff the desirable characteristic of being compressible and decompressible, because both the foam and the fabric will allow air to rapidly escape when the cuff is compressed by hand, and to enter the cuff allowing it to return to its original shape when the compressing force is removed. The use of a foam core is an inexpensive, reliable and easy way to provide a compressible watch winder cuff. A conventional cuff 39 having the typical sizes mentioned above, often can be reduced in axial length to about 1.375 inches to about 1.5 inches, when fully compressed.

As previously noted, existing watch winder cuffs 39 are generally made to accommodate watch bands having a certain standard range of lengths or sizes. And while the compressibility feature allows for some variation in the size of watch band that can be accommodated, the range is limited due to the thickness or bulk of the compressed material. For example, a cuff that has been made to accommodate a watch band of average size typically cannot be compressed enough to accommodate a watch band intended for a very small wrist.

The present invention is directed to a novel watch winder cuff system, configured to solve the problems in the art which are described above. Two alternative embodiments are described herein. The first embodiment is described with reference to FIGS. 11-21.

Figure 13:
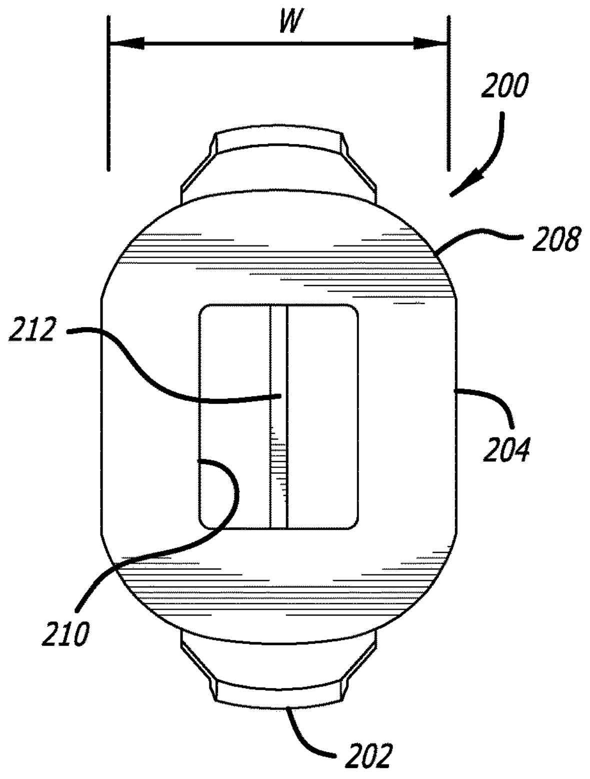
FIG. 13 is a rear plan view of the cuff of FIG. 11.
Figure 14:
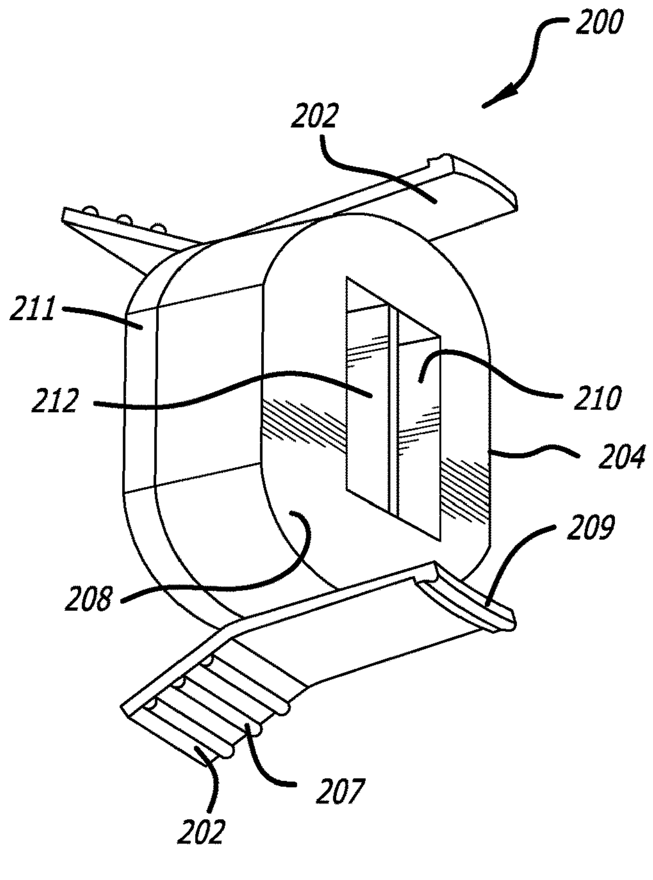
FIG. 14 is a rear perspective view of the cuff of FIG. 11.
Figure 15:
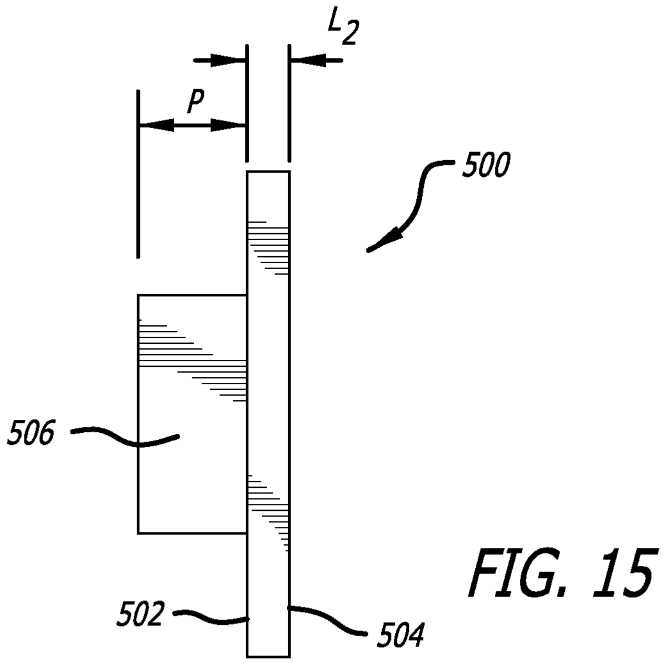
FIG. 15 is a side elevational view of a cover plate for covering the depression in the rear of the cuff of FIG. 11

Specifically, with reference to FIGS. 11-14, an embodiment of the present invention initially provides a cuff 200 which has an axial length L1, which in a preferred embodiment, is of greatly reduced size as compared to a conventional watch winder cuff. The length L1 in such embodiment is selected, in relation to the width W of the cuff 200, so that a watch having a very small strap circumference (e.g., 6.0 inches or less) can comfortably fit around the cuff in the manner such as seen in FIG. 1B (which shows a conventional prior art cuff holding a watch strap of much larger circumference). Typically, a length L1 for this purpose can be about 1 inches (plus/minus 0.125 inches) in conjunction with a cuff width W of about 2.125 inches (plus/minus 0.125 inches) along the minor axis. This will result in a cuff circumference from the front to back of about 5.75 inches to about 6.25 inches, which is small enough to accommodate a watch band intended for a very small women's wrist. The cuff 200 preferably has the same flattened oval size and shape (in plan) as the conventional cuff 39, as best depicted in FIGS. 13 and 14.

As in the case of the conventional cuff 39 previously described above, the cuff 200 of the present invention may be formed with an internal core 204 of open cell foam defining the overall desired shape of the cuff, and enclosed in suitable fabric. This will allow for some variability in the final size of the cuff 200 if it is compressed to an even smaller size when needed. The foam core 204 can be replaced with an internal spring (not shown), if desired, to impart compressibility to the cuff 200.

In this embodiment of the invention, the cuff 200 includes a mounting bracket preferably in the form of two rigid plastic tabs 202 mounted on opposite sides of the cuff that allow the cuff to be mounted in the turntable drum and permit the user to take hold of the cuff and introduce it into, or remove it from, the drum. The tabs 202 are preferably mounted on the curved portions of the flattened oval profile, as best shown in FIG. 13, to avoid interfering with the watch band when a watch is mounted on the cuff 200. The tabs 202 are preferably made of injection molded plastic or similar material, and may be wrapped with a leather covering, if desired.

In a preferred embodiment, each of the tabs 202 has a rearward portion 203 that extends alongside the outer surface of the fabric-covered core 204 beyond the rearward face 208 of the core, and a forward portion 205 which extends forwardly of the core 204 beyond the forward face 206 of the core at a slight outward angle. The forward portion 205 preferably includes a series of ribs 207 on the outer surface of the tab 202, which are used to improve finger grip when a user takes hold of the tabs 202 at the forward portion 205 to introduce the cuff 200 into, or remove it from, the turntable drum. In addition, each tab 202 preferably includes a raised ridge 209 extending along the bottom edge of the rearward portion 203, as best shown in FIG. 11. The ridge 209 is configured to engage an annular groove on the inner surface of the drum to provide a snap fit that locks the cuff 200 into place, with an audible click, when the cuff 200 is properly inserted into the turntable drum 38. When it is desired to remove the cuff 200 from the watch winder drum 38, a slight radially inward pressure on the forward end 205 of one of the tabs 202 causes the corresponding ridge to disengage from the groove. This allows the cuff 200 to easily slide out of the drum by pulling on both tabs 202. This mounting bracket is especially advantageous because it eliminates the need for a friction fit between the sidewall of the core 204 and the watch winder drum 38 which can cause wear to the fabric covering on the cuff. It also allows the cuff 200 to be securely held in the drum 38, notwithstanding the relatively short axial length L1 of the cuff 200 in relation to the axial depth of the drum. In a preferred embodiment, the rearward portion 205 of each tab 202 extends about half the depth of the drum and is spaced closely adjacent to the walls of the drum, when the cuff is inserted, to provide the cuff with a stable mounting platform.

It will be appreciated that a watch band needs to fit over the tabs 202 in order to be mounted on the cuff 200. Thus, a bracelet-type watch band with a fixed circumference will be more limited in terms of sizes that can be accommodated than a watch strap which can be unbuckled to fit around the tabs. In a preferred embodiment, the cuff 200 can accommodate a bracelet with a minimum circumference of about 6.0 inches, and watch strap with a minimum circumference (when buckled) of about 5.5 inches to about 5.75 inches, and perhaps even less when the cuff is fully compressed.

Figure 33:
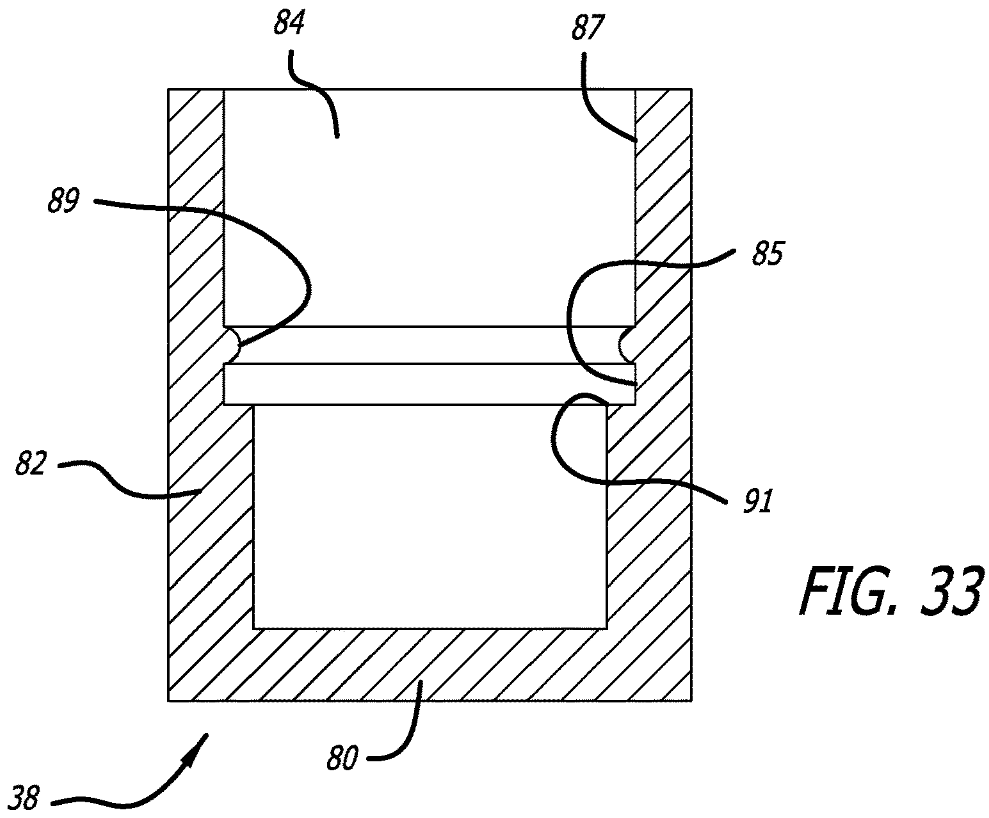
FIG. 33 is a sectional view of a turntable drum for a watch winder utilized with the present invention.

Details of the turntable drum and locking groove are best shown in FIG. 33. As previously described, the drum 38 has a circular base 80 and cylindrical sidewall 82 defining the bore 84 which receives the cuff. The locking groove 85 extends around the inner surface 87 of the sidewall 82 in an annular pattern, about midway between the base 80 and the open end of the drum opposite the base. The groove 85 has a detent 89 extending radially inwardly along the upper edge of the groove to keep the raised ridges 209 seated in the groove when the cuff 200 is locked in place. The groove 85 also has an annular ledge 91 extending radially inwardly along the lower edge of the groove to prevent the tabs 202 from being pushed too far into the drum 38. In a typical embodiment, the drum 38 has a diameter of about 3.0 inches at the opening 83, and an axial depth of about 3.0 inches from front to back. The inner surface of the sidewall 82 below the groove 85 preferably has a smaller diameter by about 0.25 inches as compared to the diameter above the groove, thereby forming the ledge 91.

The tabs 202 are preferably be mounted onto the core 204 via a mounting structure 218, which holds the tabs 202 close to, but spaced a slight distance away, from the outer sidewall surface of the core 204. The spacing allows for relative movement between the inner surface of the tabs 202 and the outer surface of the fabric-covered core 204, enabling the cuff 200 to compress and decompress in the manner described. The rearward portions 203 of the tabs 202 are also spaced close enough to the cuff body 200 to provide some degree of lateral support for the extension cuffs, to be described below.

Figure 35:
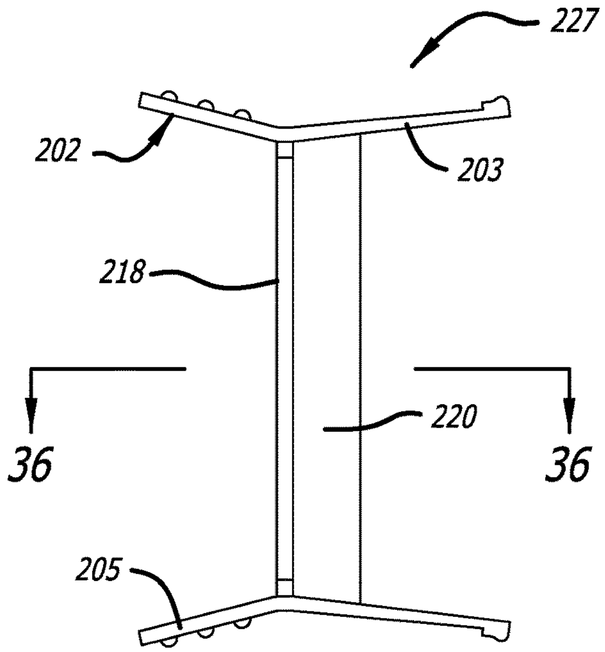
FIG. 35 is a side elevational view of the tab assembly utilized with the cuffs shown in FIGS. 11 and 22.
Figure 36:
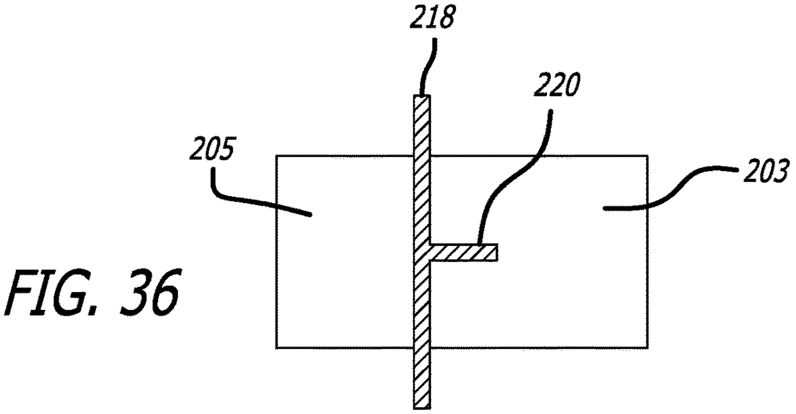
FIG. 36 is a sectional view of the tab assembly shown in FIG. 35, taken substantially along the line 36-36 in FIG. 35.
Figure 37:
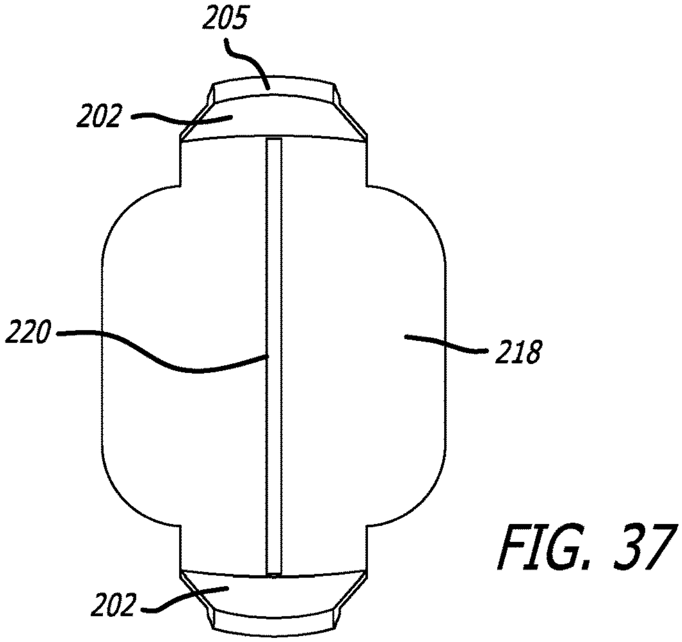
FIG. 37 is a rear plan view of the tab assembly shown in FIG. 35.

The tabs 202 and mounting structure 218 are part of an integrated tab assembly 227 best shown in FIGS. 35-37. Both tabs 202 are joined by the same mounting structure 218 which preferably is in the form of a flat plate that extends between the tabs and is molded into the tabs at the junction between the rearward 203 and forward 205 portions, as shown in FIG. 35. The mounting plate 218 preferably has the same perimeter shape (in plan) as the cuff 200, as shown in FIG. 37. When assembled into the cuff 200, the plate 218 is sandwiched between the foam core 204 and a cover 211 affixed to the front of the cuff 200. The cover 211 preferably has the same perimeter shape (in plan) as the rest of the cuff 200, and is made of rigid hardboard or similar material covered in fabric to match the fabric covering used on the rest of the cuff. A reinforcing flange 220 runs across the bottom of the mounting plate 218 and extends axially along the rearward portion 203 of the tabs 202 for about a third of their length, as best shown in FIG. 35. The flange 220 reinforces the tab assembly and adds rigidity to the tabs 202 by limiting the amount they flex when subjected to radial hand pressure. Preferably, the entire tab assembly 221 is made as a single piece from injection molded plastic or similar material.

It will be appreciated that when a cuff is configured for a person having a very small wrist, it may not be feasible to use the cuff with a watch intended for a person having a larger wrist diameter. Any attempt to fit a watch with a large strap circumference onto the smaller cuff will encounter a mismatch in which the wrist watch with a longer band hangs loose on the smaller cuff.

In order to avoid that problem and accommodate a wrist watch with a strap circumference that is larger than the size of the cuff 200, the present invention provides a first extension cuff 300 (FIG. 16) and may also include a second extension cuff 400 (FIG. 17) which is longer than the first extension cuff 300. These are configured, in the following described manner, to be individually, selectively and interchangeably attached to the cuff 200, as needed, to provide three different cuff sizes—typically small, medium and large, in a preferred embodiment. The cuff 200 itself is also configured with a cooperative attachment.

In a first embodiment of the present invention, as shown in FIGS. 11-21, the rearward face 208 of the cuff 200 is provided with a depression or opening 210 which, in a preferred embodiment, is rectangular in profile, and does not penetrate all the way through the cuff 200 but stops short of the forward face 206, as best shown in FIG. 11. The axial reinforcing flange 220 of the tab assembly 227 is exposed by the opening 210 and acts as a relatively thin divider wall 212 that extends across the depression, dividing the opening into two equal halves. If desired, the depression 210 may be fitted with an insert formed of injection molded plastic or similar material, that conforms to the shape of the depression, to protect the foam core 204.

As previously noted, the extension cuffs 300, 400 come in different lengths, the second extension cuff 400 being slightly longer than the first extension cuff 300. In a preferred embodiment, the length L3 of the first extension cuff 300 (as measured between the forward 302 and rearward 304 face) is about 1.25 inches (plus/minus 0.125 inches), whereas in a preferred embodiment the length L4 of the second extension cuff 400 (as measured between the forward 402 and rearward 404 face) is about 1.75 inches (plus/minus 0.125 inches). It will be appreciated by those skilled in the art that the lengths can be changed, if desired, to accommodate watch bands of other sizes. Both extension cuffs 300, 400 preferably have the same flattened oval size and shape (in plan) as the cuff 200. Both extension cuffs 300, 400 are preferably made from a core of open cell foam, sandwiched between two rigid plates, and covered in a porous material (in a manner similar to conventional cuff 39), to provide a degree of axial compressibility using hand force as previously described in connection with the conventional cuff 39. When fully compressed, the axial length of each extension cuff 300, 400 can be reduced to 0.375 inches or less, in a preferred embodiment.

Figure 16:
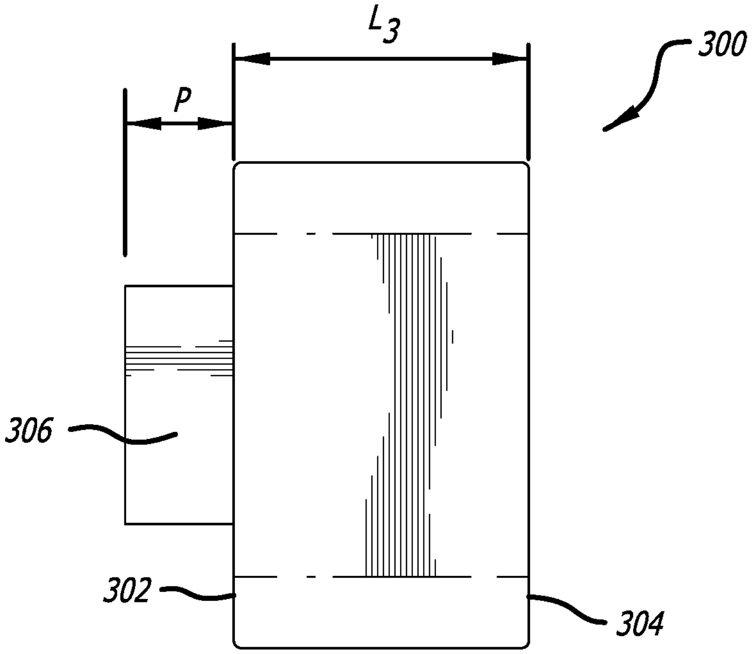
FIG. 16 is a side elevational view of a first sized extension cuff for extending the cuff of FIG. 11.
Figure 17:
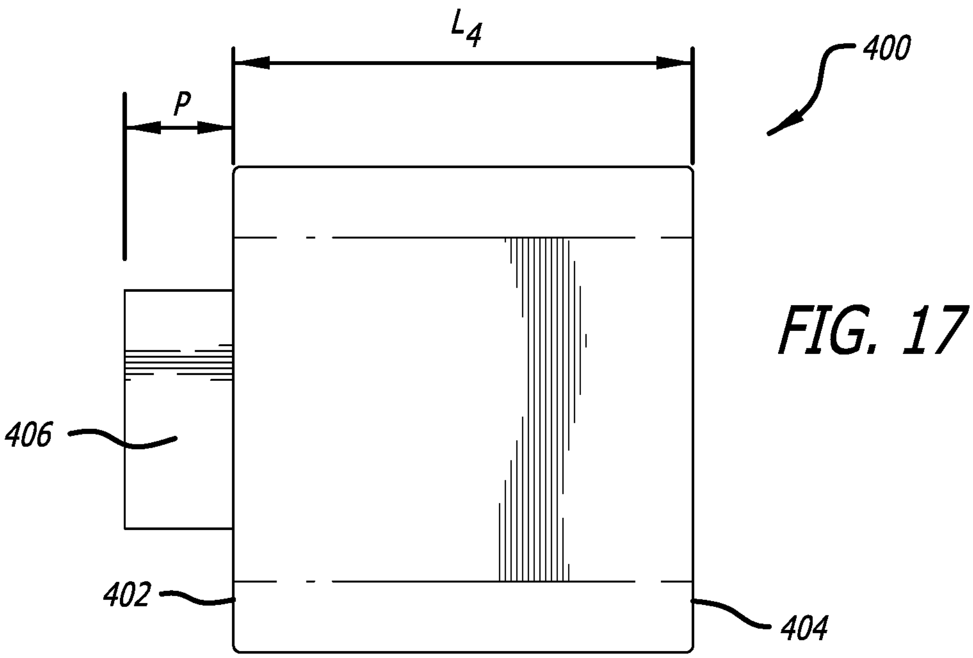
FIG. 17 is a side elevational view of a second sized extension cuff for extending the cuff of FIG. 11.
Figure 18:
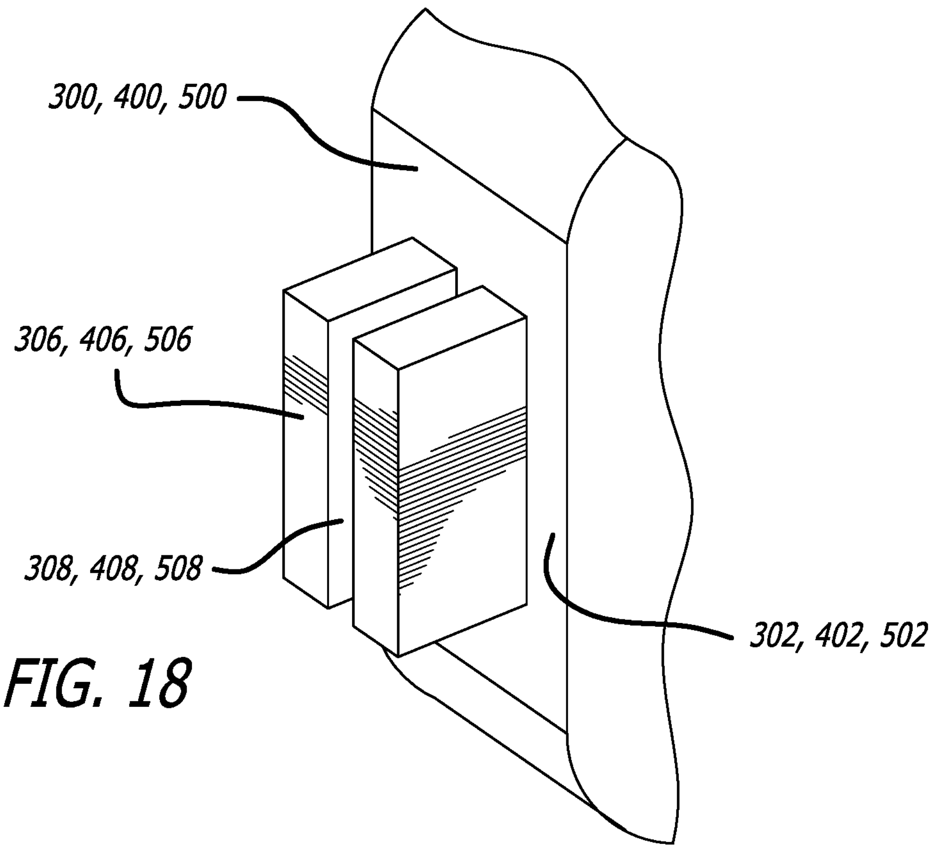
FIG. 18 is an enlarged fragmentary front perspective view of the cover plate and extension cuffs of FIGS. 15-17, showing a stub for connection with the depression in the cuff of FIG. 11.
Figure 20:
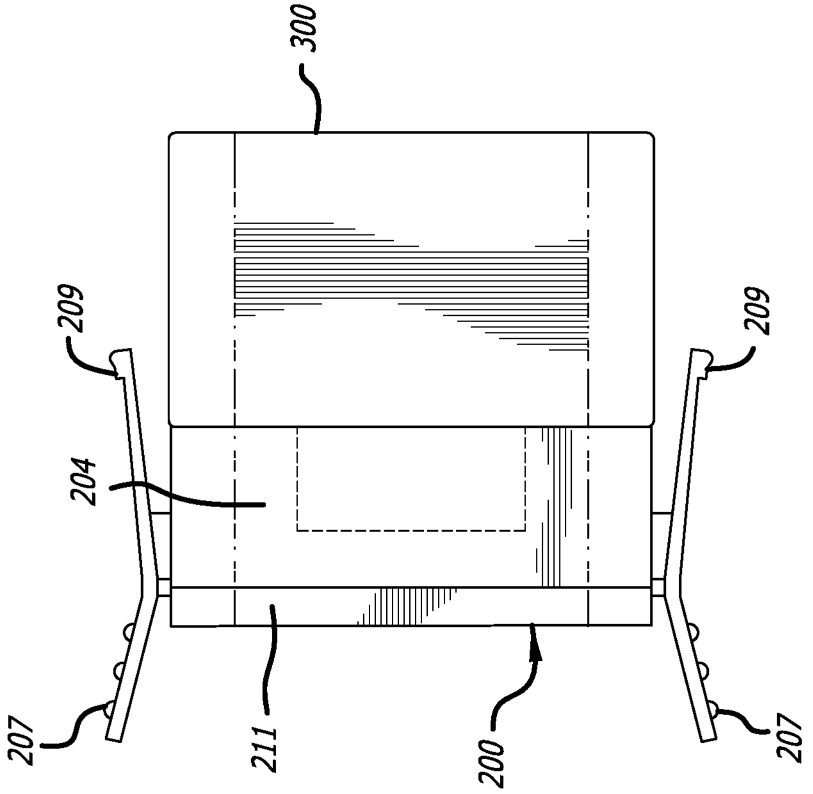
FIG. 20 is a side elevational view showing the cuff of FIG. 11 joined with the first sized extension cuff of FIG. 16.
Figure 19:
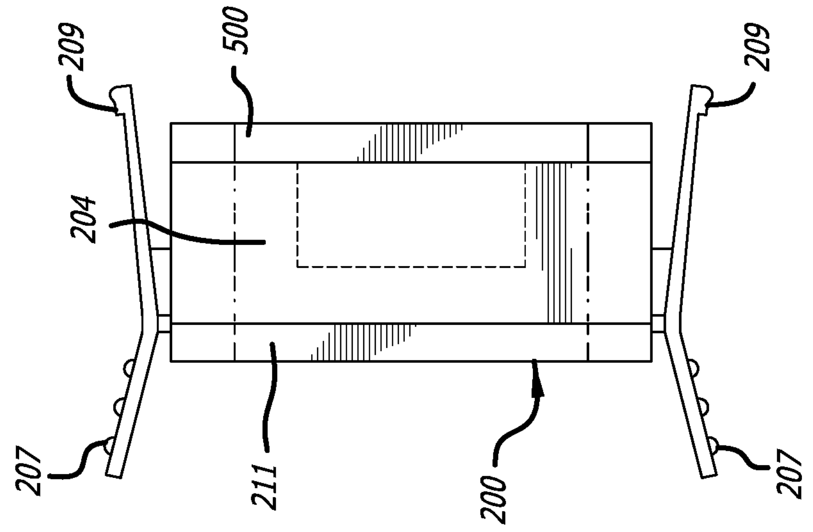
FIG. 19 is a side elevational view showing the cuff of FIG. 11 joined with the cover plate of FIG. 15.
Figure 21:
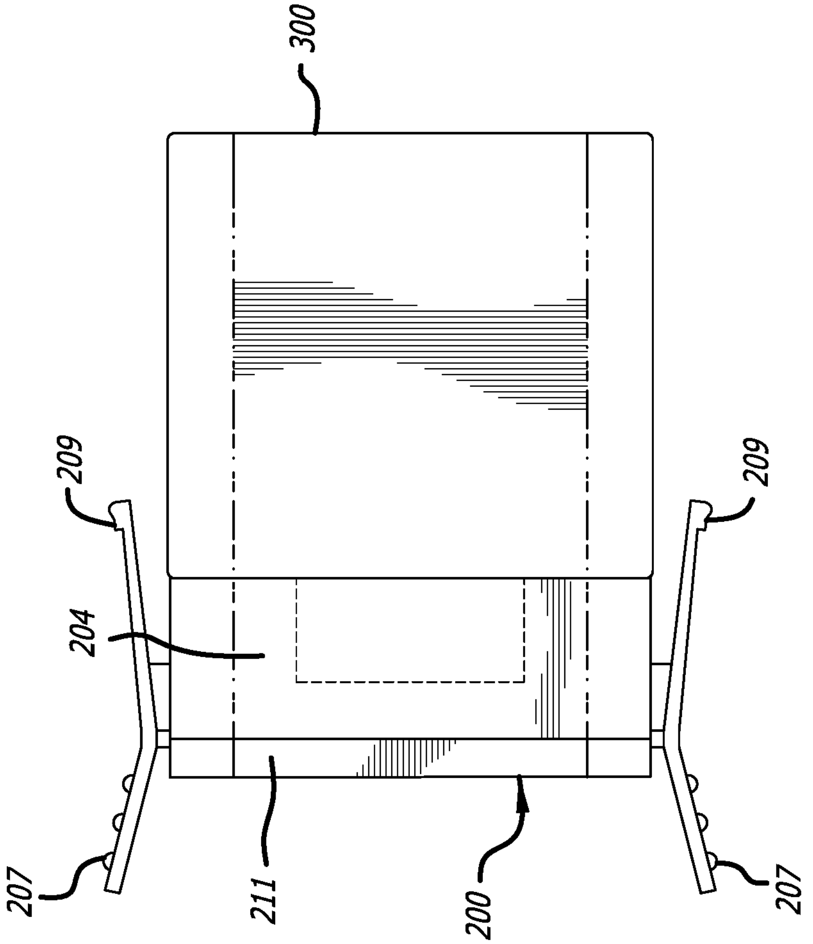
FIG. 21 is a side elevational view showing the cuff of FIG. 11 joined with the second sized extension cuff of FIG. 17.
Figure 22:
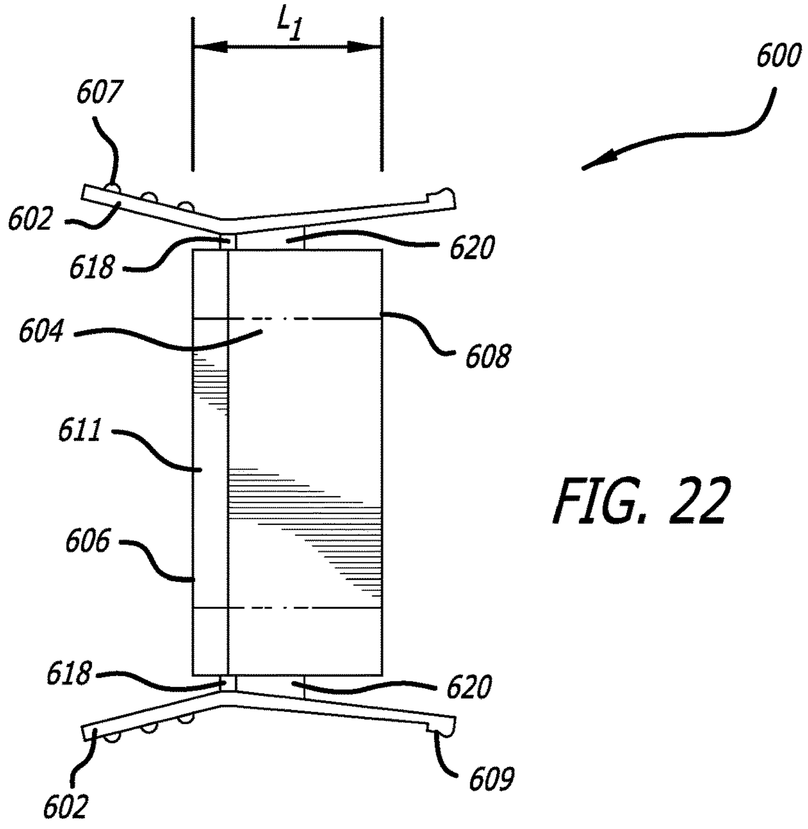
FIG. 22 is a side elevational view of an alternative embodiment of a cuff having features of the present invention.

As previously noted, each of the extension cuffs 300, 400 has a forward face 302, 402 and a rearward face 304, 404, respectively, as depicted in FIGS. 16-17. Attached to the forward face 302, 402 of each extension cuff 300, 400 is a male connector in the form of a stub 306, 406 which extends forwardly from the front face 302, 402 of the extension cuff 300, 400. The stub 306, 406 may include a narrow slit or aperture 308, 408 extending through the stub, splitting the stub into two equal halves as shown in FIG. 18. The external configuration of the connector stub 306, 406 is designed to snugly fit into the depression 210 on the rearward face 208 of the cuff 200 via a friction fit, with the depression acting as a female connector. For this purpose, the connector stub 306, 406 has generally the same rectangular profile and protrusion length P as the rectangular profile and depth D of the depression 210, and the slit 308, 408 in the stub 306, 406 snugly receives the divider 212 spanning the depression 210. Preferably, the stub 306, 406 is made of injection molded plastic or similar material.

In a further aspect, the cuff 200 may be provided with a flat cover plate 500 (FIG. 15) having a very short axial length L2. The purpose of the cover plate 500 is to close off the depression or opening 210 on the rearward face 208 of the cuff 200 when the cuff is not being used in conjunction with an extension cuff 300, 400. Accordingly, the cover plate 500 includes the same form of connector stub 506 that is found on the two extension cuffs 300, 400. The forward surface 302, 402, 502 of the plate 500 and the two extension cuffs 300, 400 is shown in more detail in FIG. 18, each of which carries the same common feature in the form of the connector stub 306, 406, 506 which snugly fits into the depression on the rearward face 208 of the cuff 20, when they are used in conjunction with the cuff 200. The cover plate 500 is preferably made of injection molded plastic or similar material, and is very thin (e.g., with an axial length L2 of no more than about 1-2 mm as measured between the forward 502 and rearward 504 face).

The cuff 200 may be used by itself, with the cover plate 500 in place, to accommodate a watch having a very small band circumference, as previously described. Alternatively, when the need arises to accommodate a watch band of larger size, one of the extension cuffs 300 or 400 is selected to provide, in combination with the cuff 200, a circumference (extending in the axial direction around the cuff) sufficient to accommodate the circumference of the band on the watch that is about to be wound by the watch winder. After the cover plate 500 is removed from the cuff 200, the stub 306 or 406 of the selected extension cuff 300,400 is inserted into the mating depression 210 on the cuff 200, until the cuff and extension cuff are snugly joined in unison, as exemplified in FIG. 20 or FIG. 21. The watch that is to be wound is then installed on the cuff in the customary way as described above and as shown in FIG. 1B (where a conventional prior art cuff 39 is illustrated) so that the combination of watch and cuff 200 with cuff extension 300,400 may be inserted into the turntable drum 38 for rotation and winding.

Once the winding operation has been completed, the extension cuff 300, 400 may be disengaged from the cuff 200, and the cover plate 500 re-installed on the rearward surface 208 of the cuff. The cuff 200 may then be stored in this condition until the next time the cuff must be used. At such time, the user then decides whether to use the cuff 200 alone (with cover plate 500), or to include either of the two extension cuffs 300 or 400.

Preferably, each of the extension cuffs 30, 400 has sufficient axial compressibility so that the cuff 200 and selected extension cuff 300, 400 when joined together and fully compressed, has an axial length only slightly longer (e.g., about 0.125 inches longer or less) than the axial length of the uncompressed cuff 200.

As an alternative to the mating stub and depression type connector shown in FIGS. 11-18, the stub and depression can be replaced with a conventional hook and loop type fastener system (not shown), if desired. This eliminates the need for the cover plate 500 to cover an opening in the rearward face of the cuff.

In a second embodiment of the present invention, a further cuff and cuff extension configuration is described, configured to carry out the same function as that described above, but with a different structural configuration.

Specifically, with reference to FIGS. 22-32, this embodiment of the invention initially provides a cuff 600, as best shown in FIGS. 22-25. The length of the cuff 600 is selected, in relation to the width of the cuff, so that a watch having a very small strap circumference (e.g., 6.0 inches or less) can comfortably fit around the cuff in the manner previously described. The length and width of this cuff 600 may be the same as the cuff 200 in the embodiment of FIGS. 11-14, and may be fabricated from the same or similar material. The cuff 600 preferably has the same flattened oval size and shape (in plan) as the cuff 200, and like the cuff 200, may be formed of an internal core 604 of open cell foam having the overall desired shape of the cuff, and enclosed in suitable fabric to allow a limited degree of axial compression under hand force.

In this embodiment of the invention, the cuff 600 also preferably includes a mounting bracket preferably in the form of two rigid tabs 602 similar in structure and function to the tabs 202 of the previous embodiment and preferably made of injection molded plastic or similar material. The tabs 602 are mounted onto the cuff 600 via a mounting structure 618 similar to the previous embodiment, which holds the tabs 602 close to but spaced a slight distance away from the outer sidewall surface of the core 604. The mounting structure 618 includes an axial reinforcing flange 620 similar in structure and function to the flange 220 of the previous embodiment. The mounting structure 618 and reinforcing flange 620 may be molded onto the tabs 602 in a manner similar to the previous embodiment.

Figure 23:
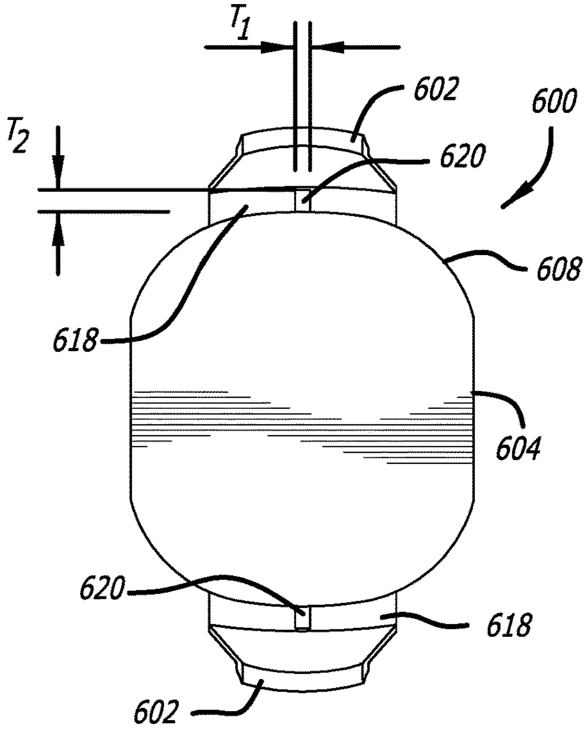
FIG. 23 is a rear plan view of the cuff of FIG. 22.
Figure 24:
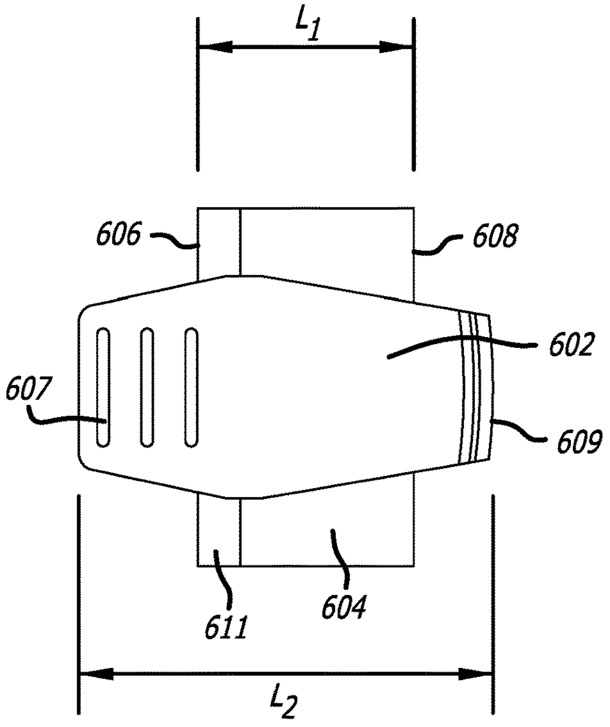
FIG. 24 is a another side elevational view of the cuff of FIG. 22, rotated ninety degrees.
Figure 25:
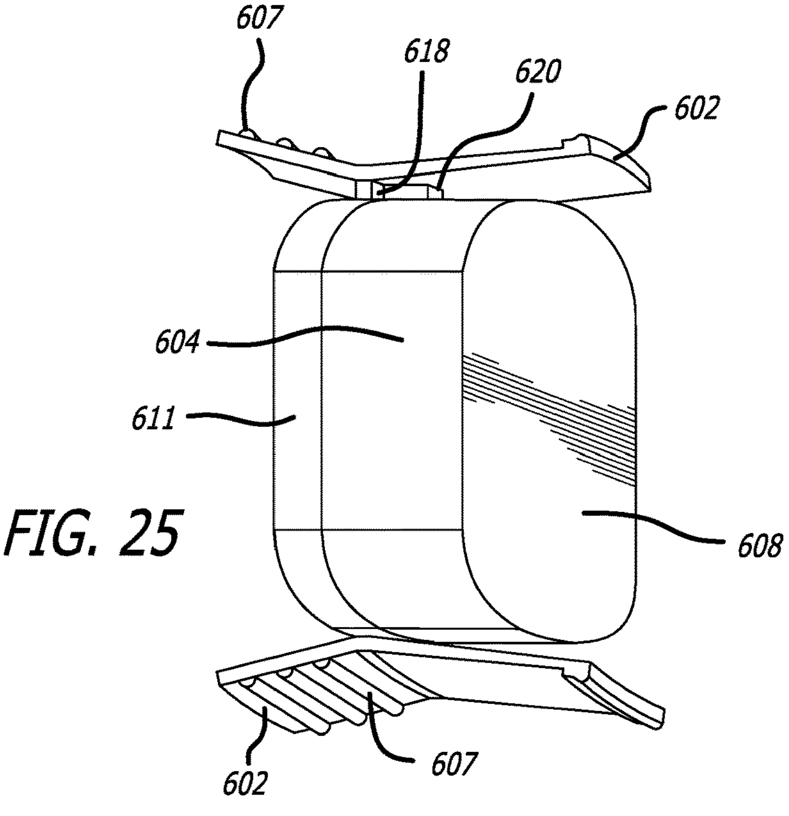
FIG. 25 is a rear perspective view of the cuff of FIG. 22.
Figure 26:
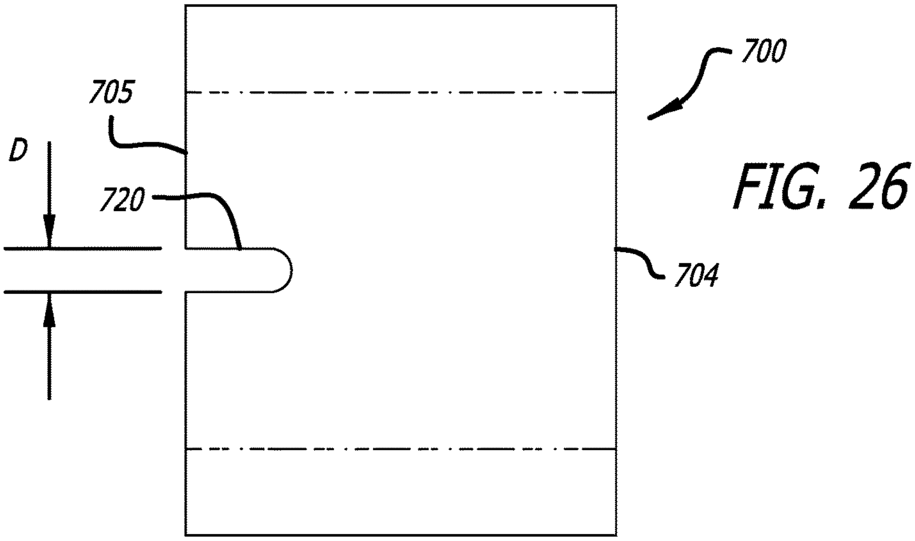
FIG. 26 is a side elevational view of a first sized extension cuff for extending the cuff of FIG. 22.
Figure 27:
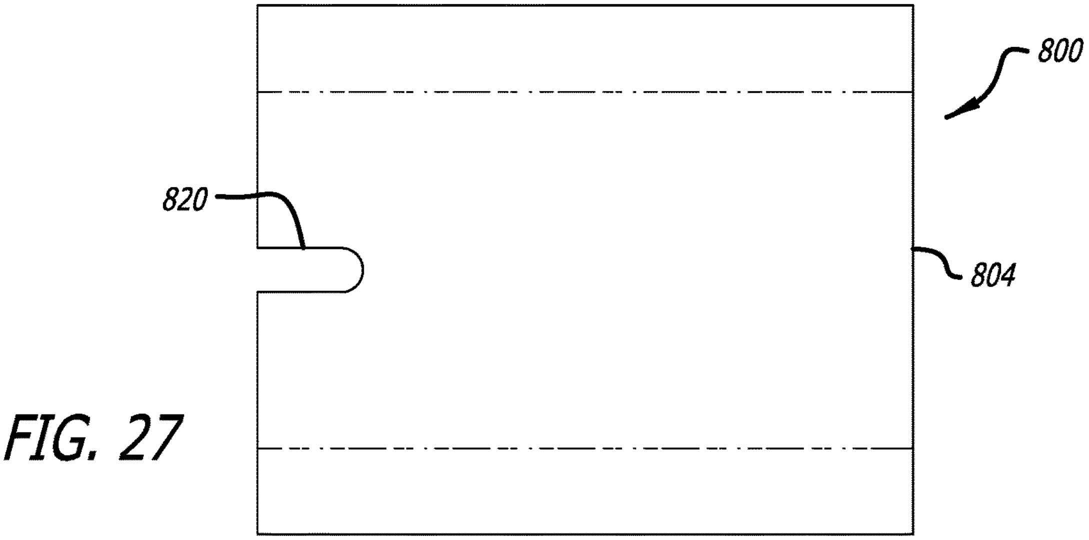
FIG. 27 is a side elevational view of a second sized extension cuff for extending the cuff of FIG. 22.
Figure 28:
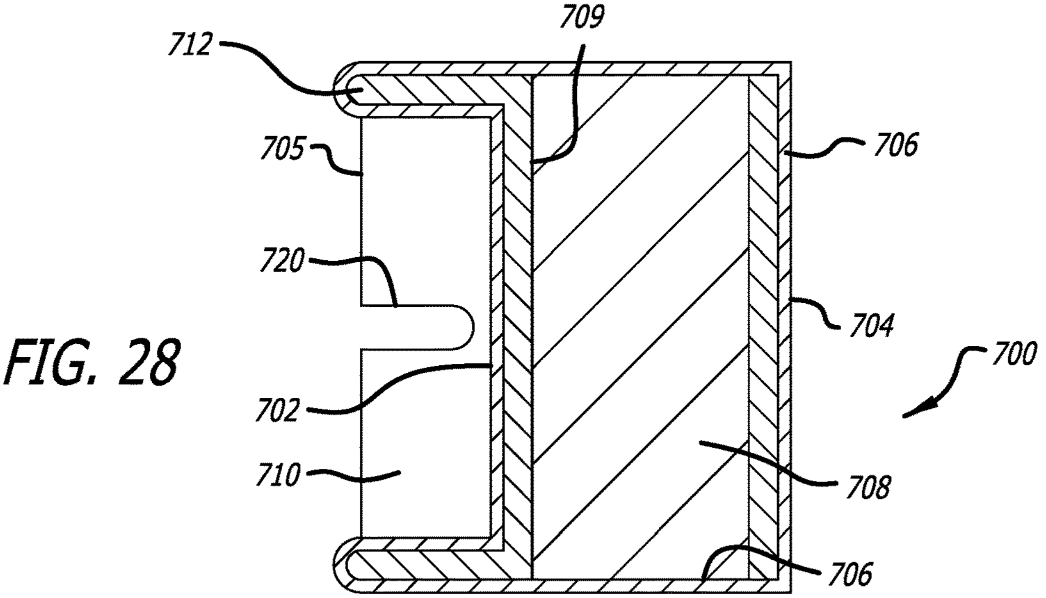
FIG. 28 is a sectional view of the first sized extension cuff shown in FIG. 26.
Figure 29:
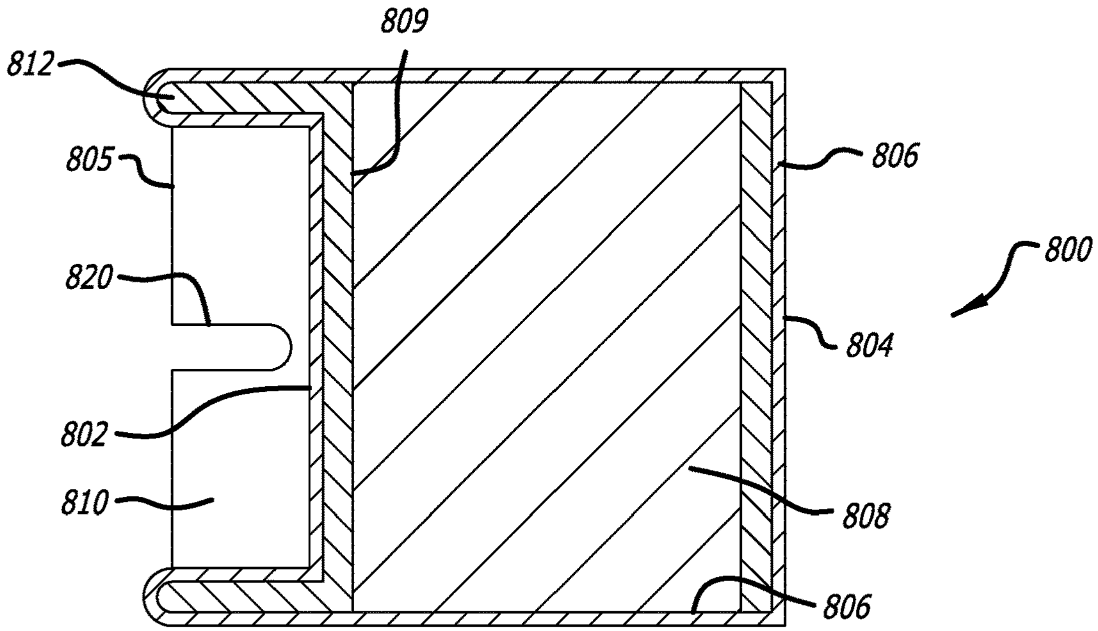
FIG. 29 is a sectional view of the second size extension cuff shown in FIG. 27.
Figure 30:
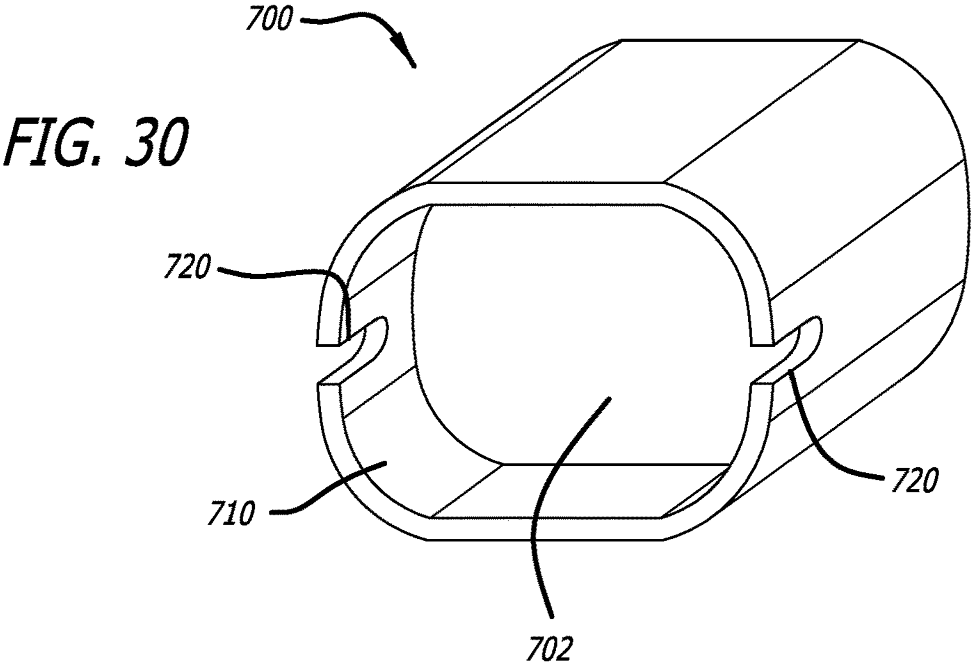
FIG. 30 is a front perspective view of the first size extension cuff shown in FIG. 26.

As seen in FIG. 23, the reinforcing flange 620 is relatively thin, shown with a thickness of "T1," and mounting plate 618 provides a small space, "T2," between the core 604 and each tab 602. Preferably, the dimension of T1 is about lmm, and the dimension T2 is similarly about 1 mm. The length of the reinforcing flange 620 may occupy about half the length L1 of the core 604. The tabs 602 are provided with ribs 609 (similar to the cuff 200) for locking the cuff 600 into place in the turntable drum 38.

As in the previous embodiment of cuff 200, in order to accommodate a wrist watch with a band circumference that is larger than the axial circumference of the cuff 600, the invention provides a first extension cuff 700 (FIG. 26) and may also include a second extension cuff 800 (FIG. 27) which is longer than the first extension cuff 700 in the same way that extensions 300 and extension 400 relate to each other. Both extension cuffs 700, 800 have the same flattened oval size and shape (in plan) as the cuff 600. In a preferred embodiment, the axial length of the first extension cuff 700 (including the sleeve 710 to be described) is about 2.25 inches (plus/minus 0.125 inches) and the axial length of the second extension cuff 800 (including the sleeve 810 to be described) is about 2.75 inches (plus/minus 0.125 inches), although both lengths can be changed, if desired, to accommodate watch straps of other sizes. These extension cuffs 700, 800 are configured, as described below, to be selectively, interchangeably and individually attached to the cuff 600, as needed.

Figure 34:
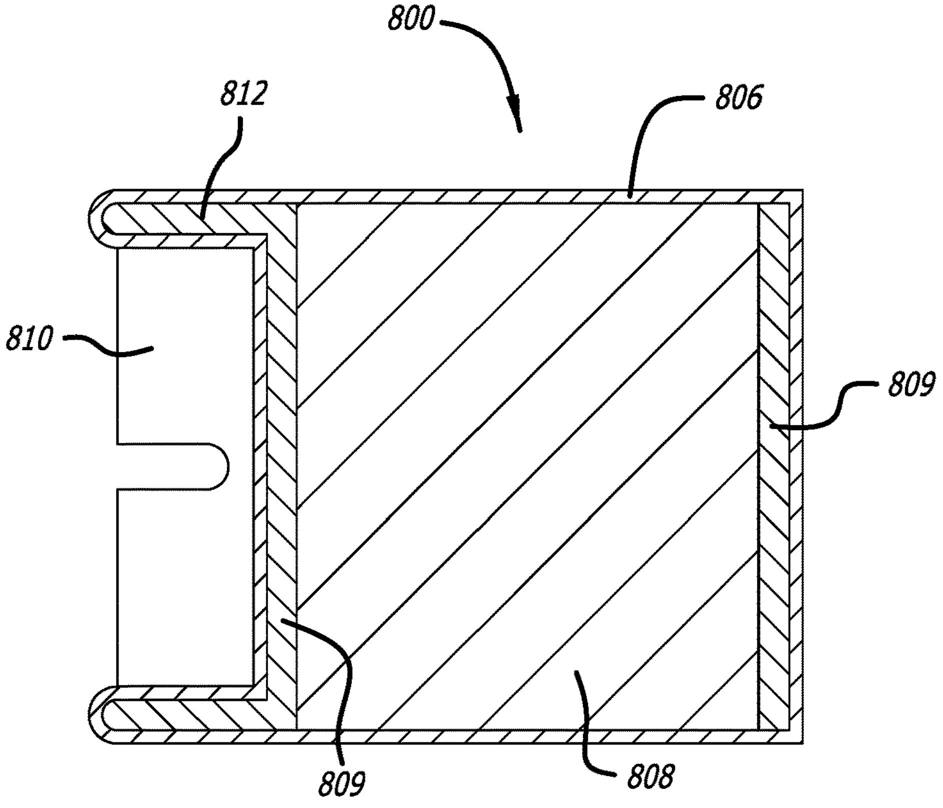
FIG. 34 is an enlarged sectional view of the extension cuff shown in FIG. 27.

The first extension cuff 700 and the second extension cuff 800 of this embodiment each include the same structure as each other for selective connection to the cuff 600. Specifically, both extension cuffs 700, 800 include a connector in the form of a collar or sleeve 710, 810 which extends forwardly of the cuff body and may be covered in the same fabric as the covering 706, 806 which covers both extensions 700 and 800. To impart some stiffness to the sleeve 710, 810, the fabric material may be doubled over a rigid hardboard or plastic insert 712, 812 having the overall desired shape of the sleeve, as best shown in FIG. 34. The rest of the extension cuff 700, 800 includes an internal core 708, 808 of open cell foam having the overall desired shape of the cuff, sandwiched between two rigid plates 709, 809, preferably made of rigid hardboard or plastic material and enclosed in a porous material 706, 806 which may be stitched or glued at the seams, to impart compressibility to the extension cuffs 700, 800. In a preferred embodiment, the rigid plate 709, 809 at the forward end of the extension cuff 700, 800 may be made of the same material as the stiffener insert 712, 812. When fully compressed, the axial length of each extension cuff 700, 800 can be reduced to 1.375 inches or less (including the sleeve), in a preferred embodiment.

Figure 31:
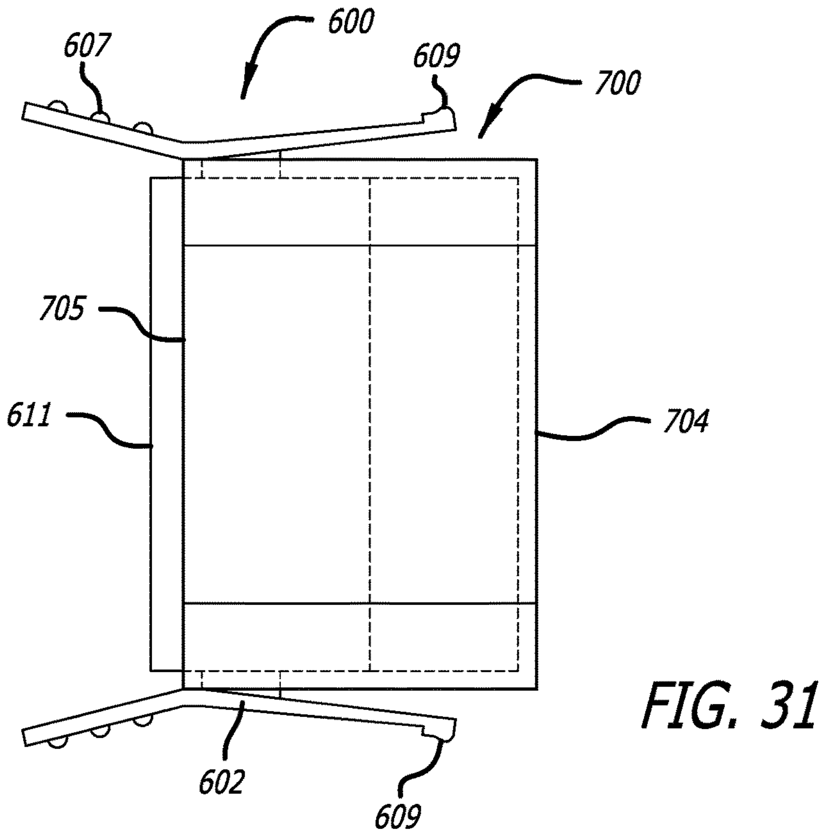
FIG. 31 is a side elevational view showing the cuff of FIG. 22 joined with the first sized extension cuff of FIG. 26.
Figure 32:
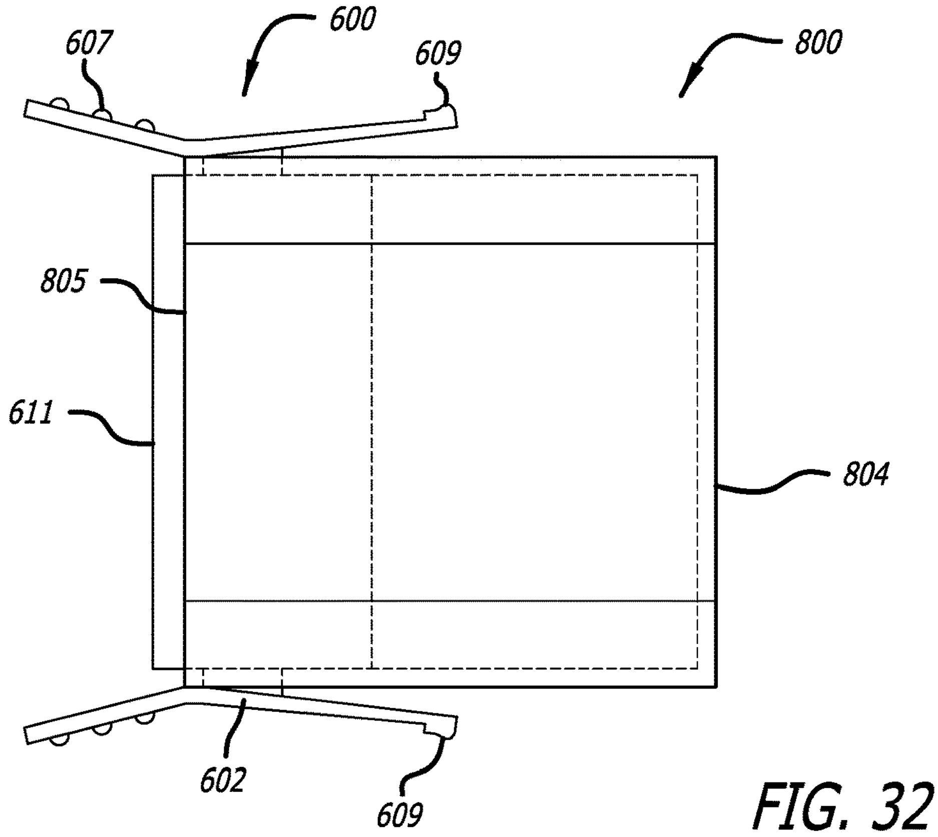
FIG. 32 is a side elevational view showing the cuff of FIG. 22 joined with the second sized extension cuff of FIG. 27.

The forwardly extending length of each sleeve 710, 810 is preferably the same length L1 as the axial length of the cuff 600 (as shown FIG. 22) less the cover 611 in order that the cuff body below the cover may be fully received within the sleeve 710, 810. On opposite sides of the sleeve 720, 820, two axially extending U-shaped slits or notches 720, 820 are formed in the sleeve and sized to fit around the axial flanges 620 of the cuff 600. Preferably, the width "D" of each slit 710, 810 may be between 1 mm and 3 mm, but no narrower than the width T1 selected for the axial flange 620. The thickness of the sleeve 710, 810 may be between 1 mm and 2 mm, but no greater than the spacing depth "T2" as depicted in FIG. 23. Under this arrangement, the sleeve 720, 820 is sized and shaped to fit snugly over the cuff body 600, with the slits 720, 820 receiving the axial flange 620 in full. A friction fit between the outer surface of the cuff 600 and the inner surface of the sleeve 710, 810 acts to hold the extension cuff 700, 800 in place, while the matching flat oval shapes of the cuff 600 and sleeve 710, 810, and to some degree the axial flange 620 disposed in the slits 720, 820, resist rotation of the extension cuff. The result of this conjunction is shown in FIGS. 31, 32. These preferred side views of the conjoined cuff 600 and extensions 700, 800 show that only the extension cuff 700, 800 and the tabs 602 of the cuff 600 are visible in use below the cover 611, thus producing the same outward visual appearance as a conventional cuff. In this conjoined condition, the cuff 600 and cuff extension 700, 800 may be used in the same way as the cuff and extension systems shown in FIGS. 20 and 21.

Thus, as set forth above, the present invention addresses problems found in the art in a new and advantageous way.

While the specification describes particular embodiments of the present invention, it will also be apparent to those of ordinary skill that various modifications can be made without departing from the spirit of the invention which addresses problems associated with using the watch winder with watches whose bands are substantially different in size.

We claim:

1. A system for retaining a watch in a watch winder, the system comprising:

a watch winder cuff defining a first circumferential profile, the cuff having a first axially forward portion and a first axially rearward portion, and further including a mounting bracket mounted on the cuff for connecting the watch winder cuff to the watch winder; and an extension cuff defining a second circumferential profile shaped to match the first circumferential profile, the extension cuff further defining a second axially forward portion and a second axially rearward portion, the second axially forward portion including a connector for engaging the first axially rearward portion to selectively join the watch winder cuff and extension cuff together.

2. The system of claim 1, wherein:

the watch winder cuff further defines a first axially forward surface and a first axially rearward surface; and the extension cuff defines a second axially forward surface and a second axially rearward surface, and the connector comprises a hollow sleeve extending forwardly from the second axially forward surface, the sleeve being configured to fit snugly over the first axially rearward portion of the watch winder cuff when the first axially rearward surface is positioned in close proximity to the second axially forward surface to join the watch winder cuff and extension cuff together.

3. The system of claim 2, wherein the mounting bracket includes two tabs mounted on the watch winder cuff via a mounting plate that separates the tabs from the cuff, the mounting plate including a reinforcing flange extending axially along the cuff, and wherein the sleeve is provided with two slits, each slit extending axially rearward from a forward edge of the sleeve towards the second axially forward surface, and wherein the sleeve is configured to fit snugly over the first axially rearward portion of the watch winder cuff between the watch winder cuff and the tabs, with portions of the reinforcing flange received inside the slits when the watch winder cuff and extension cuff are joined together.

4. The system of claim 1, wherein:

the watch winder cuff further defines a first axially forward surface and a first axially rearward surface having a first connector disposed thereon; and wherein the extension cuff further defines a second axially forward surface and a second axially rearward surface, the second axially forward surface having a second connector disposed thereon for engaging the first connector when the first axially rearward surface is positioned in close proximity with the second axially forward surface to join the watch winder cuff and extension cuff together, wherein the first connector comprises a rectangular opening in the first axially rearward surface, and the second connector comprises a rectangular stub configured to fit snugly inside the opening.

5. The system of claim 4, wherein the rectangular opening includes a divider wall having a first thickness extending across the opening and dividing the opening into two equal halves, and wherein the rectangular stub is cleaved into two equal halves by a slit having a second thickness sized to snugly receive the divider wall when the stub is inserted into the opening.

6. The system of claim 2, wherein the first axially forward surface and the first axially rearward surface are separated by a distance of about one inch.

7. The system of claim 2, wherein the second axially forward surface and the second axially rearward surface are separated by a distance of about 1.25 inches to about 1.75 inches.

8. The system of claim 4, wherein the first axially forward surface and the first axially rearward surface are separated by a distance of about one inch.

9. The system of claim 4, wherein the second axially forward surface and the second axially rearward surface are separated by a distance of about 1.25 inches to about 1.75 inches.

10. The system of claim 1, wherein the watch winder cuff, when not joined together with the extension cuff, has an axially oriented perimeter of about 5.75 inches to about 6.25 inches, and wherein the watch winder cuff and extension cuff, when joined together, have an axially oriented perimeter of about 8.75 inches to about 9.75 inches.

11. The system of claim 1, wherein the watch winder cuff and the extension cuff are made of compressible foam material which is axially compressible.

12. The system of claim 1, further comprising:

a second extension cuff defining a third circumferential profile shaped to match the first circumferential profile, the second extension cuff further defining a third axially forward portion and a third axially rearward portion, the third axially forward portion including a connector for engaging the first rearward portion to selectively join the watch winder cuff and second extension cuff together;

the extension cuff having a first axial length and the second extension cuff having a second axial length, the first axial length differing from the second axial length; and wherein the extension cuff and the second extension cuff are interchangeably, individually and selectively connectable to the watch winder cuff, the watch winder cuff and extension cuff, when joined together, having a first axially oriented perimeter, and the watch winder cuff and second extension cuff, when joined together, having a second axially oriented perimeter, the first axially oriented perimeter differing from the second axially oriented perimeter.

13. The system of claim 4, further comprising:

a flat cover plate defining a third circumferential profile shaped to match the first circumferential profile, the flat cover plate having a third connector disposed thereon for engaging the first connector to selectively join the watch winder cuff and flat cover plate together to cover the rectangular opening.

14. A system for retaining a watch in a watch winder, the system comprising:

a watch winder cuff defining a first circumferential profile, the cuff having a first axially forward portion and a first axially rearward portion; and an extension cuff defining a second circumferential profile shaped to match the first circumferential profile, the extension cuff having a second axially forward portion and a second axially rearward portion, the second axially forward portion defining a connector for engaging the first axially rearward portion, wherein the connector comprises a hollow sleeve configured to fit snugly over the first axially rearward portion of the watch winder cuff to selectively join the watch winder cuff and extension cuff together.

15. The system of claim 14, wherein the watch winder cuff and the extension cuff are made of compressible foam material which is axially compressible.

16. The system of claim 14, wherein the hollow sleeve includes a stiffener having the overall desired shape of the sleeve.

17. The system of claim 14, wherein the watch winder cuff, when not joined together with the extension cuff, has an axially oriented perimeter of about 5.75 inches to about 6.25 inches, and wherein the watch winder cuff and extension cuff, when joined together, have an axially oriented perimeter of about 8.75 inches to about 9.75 inches.

18. A system for retaining a watch in a watch winder, the system comprising:

a watch winder cuff defining a first circumferential profile, the cuff having a first axially forward portion and a first axially rearward portion; and an extension cuff defining a second circumferential profile shaped to match the first circumferential profile, the extension cuff further defining a second axially forward portion and a second axially rearward portion, the second axially forward portion including a connector for engaging the first axially rearward portion to selectively join the watch winder cuff and extension cuff together; wherein the watch winder cuff and extension cuff are axially compressible.

19. The system of claim 18, wherein the watch winder cuff and the extension cuff are made of compressible foam material.

20. The system of claim 18, wherein:

the watch winder cuff further defines a first axially forward surface and a first axially rearward surface; and the extension cuff defines a second axially forward surface and a second axially rearward surface, and the connector comprises a hollow sleeve extending forwardly from the second axially forward surface, the sleeve being configured to fit snugly over the first axially rearward portion of the watch winder cuff when the first axially rearward surface is positioned in close proximity to the second axially forward surface to join the watch winder cuff and extension cuff together.

21. The system of claim 18, wherein:

the watch winder cuff further defines a first axially forward surface and a first axially rearward surface having a first connector disposed thereon;

the extension cuff further defines a second axially forward surface and a second axially rearward surface, the second axially forward surface having a second connector disposed thereon for engaging the first connector when the first axially rearward surface is positioned in close proximity with the second axially forward surface to join the watch winder cuff and extension cuff together, wherein the first connector comprises a rectangular opening in the first axially rearward surface, and the second connector comprises a rectangular stub configured to fit snugly inside the opening; and wherein the rectangular opening includes a divider wall having a first thickness extending across the opening and dividing the opening into two equal halves, and wherein the rectangular stub is cleaved into two equal halves by a slit having a second thickness sized to snugly receive the divider wall when the stub is inserted into the opening.

22. The system of claim 20, wherein the first axially forward surface and the first axially rearward surface are separated by a distance of about one inch.

23. The system of claim 20, wherein the second axially forward surface and the second axially rearward surface are separated by a distance of about 1.25 inches to about 1.75 inches.

24. The system of claim 18, wherein the watch winder cuff, when not joined together with the extension cuff, has an axially oriented perimeter of about 5.75 inches to about 6.25 inches, and wherein the watch winder cuff and extension cuff, when joined together, have an axially oriented perimeter of about 8.75 inches to about 9.75 inches.

25. The system of claim 18, further comprising:

a second extension cuff defining a third circumferential profile shaped to match the first circumferential profile, the second extension cuff further defining a third axially forward portion and a third axially rearward portion, the third axially forward portion including a connector for engaging the first rearward portion to selectively join the watch winder cuff and second extension cuff together;

the extension cuff having a first axial length and the second extension cuff having a second axial length, the first axial length differing from the second axial length; and wherein the extension cuff and the second extension cuff are interchangeably, individually and selectively connectable to the watch winder cuff, the watch winder cuff and extension cuff, when joined together, having a first axially oriented perimeter, and the watch winder cuff and second extension cuff, when joined together, having a second axially oriented perimeter, the first axially oriented perimeter differing from the second axially oriented perimeter.

* * * * *